(12) United States Patent
Imada

(10) Patent No.: US 11,150,508 B2
(45) Date of Patent: Oct. 19, 2021

(54) LIGHT EMITTING DEVICE

(71) Applicant: NICHIA CORPORATION, Anan (JP)

(72) Inventor: Mamoru Imada, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 16/545,355

(22) Filed: Aug. 20, 2019

(65) Prior Publication Data
US 2020/0064687 A1 Feb. 27, 2020

(30) Foreign Application Priority Data

Aug. 21, 2018 (JP) .............................. JP2018-154821

(51) Int. Cl.
G02F 1/1335 (2006.01)
G02F 1/13357 (2006.01)

(52) U.S. Cl.
CPC .. *G02F 1/133553* (2013.01); *G02F 1/133504* (2013.01); *G02F 1/133514* (2013.01); *G02F 1/133524* (2013.01); *G02F 1/133602* (2013.01)

(58) Field of Classification Search
CPC ......... G02F 1/133553; G02F 1/133504; G02F 1/133514; G02F 1/133524; G02F 1/133602
USPC .......................................................... 257/98
See application file for complete search history.

(56) References Cited

U.S. PATENT DOCUMENTS

| 8,764,230 B2 | 7/2014 | Greiner |
| 2007/0121340 A1 | 5/2007 | Hoshi |
| 2009/0086508 A1 | 4/2009 | Bierhuizen |
| 2010/0002414 A1* | 1/2010 | Meir ..................... G02B 6/0021 362/84 |
| 2010/0008628 A1 | 1/2010 | Shani |
| 2010/0195306 A1* | 8/2010 | Helbing .................... F21K 9/68 362/84 |
| 2010/0201611 A1* | 8/2010 | Duong ................... H05B 45/20 345/83 |
| 2010/0220484 A1* | 9/2010 | Shani ..................... G02B 6/009 362/296.09 |
| 2010/0315817 A1* | 12/2010 | Zimmermann ......... H01L 33/58 362/296.01 |
| 2011/0149594 A1 | 6/2011 | Terajima et al. |
| 2015/0124484 A1 | 5/2015 | Gu et al. |

(Continued)

FOREIGN PATENT DOCUMENTS

| JP | H10173870 A | 6/1998 |
| JP | 2007048489 A | 2/2007 |

(Continued)

*Primary Examiner* — Dzung Tran
(74) *Attorney, Agent, or Firm* — Hunton Andrews Kurth LLP

(57) ABSTRACT

A light emitting device includes: a lightguide plate including a first surface on which a plurality of first recesses are provided; a light-reflective resin layer located on a bottom portion of each first recess; a plurality of light emitting elements each having an upper surface and a lateral surface, wherein each one of the plurality of light emitting elements is arranged in a corresponding one of the plurality of first recesses; and a plurality of wavelength conversion members, wherein: the upper surface of each light emitting element is attached to the light-reflective resin layer; and each of the plurality of wavelength conversion members covers the lateral surface of the light emitting element in the first recess.

18 Claims, 15 Drawing Sheets

(56) References Cited

U.S. PATENT DOCUMENTS

| | | |
|---|---|---|
| 2015/0129902 A1 | 5/2015 | Iino |
| 2018/0182940 A1 | 6/2018 | Yamamoto et al. |
| 2018/0239193 A1 | 8/2018 | Hayashi |

FOREIGN PATENT DOCUMENTS

| | | | |
|---|---|---|---|
| JP | 2007149451 A | | 6/2007 |
| JP | 2009152152 A | | 7/2009 |
| JP | 2010008837 A | | 1/2010 |
| JP | 2010541154 A | | 12/2010 |
| JP | 2011210674 A | | 10/2011 |
| JP | 2011211085 A | | 10/2011 |
| JP | 2012146942 A | | 8/2012 |
| JP | 2013030404 A | | 2/2013 |
| JP | 2015095488 A | | 5/2015 |
| JP | 2018107257 A | | 7/2018 |
| JP | 2018133304 A | | 8/2018 |

\* cited by examiner

16pcs.
8pcs.

LIGHT EMITTING DEVICE

CROSS REFERENCE TO RELATED APPLICATION

This application claims priority to Japanese Patent Application No. 2018-154821, filed on Aug. 21, 2018, the disclosure of which is hereby incorporated by reference in its entirety.

BACKGROUND

The present disclosure relates to a light emitting device.

Light emitting devices are known in the art in which a plurality of light sources such as LED chips are arranged two-dimensionally (e.g., Japanese Patent Publication No. 2011-211085, Japanese Patent Publication No. 2011-210674 and Japanese Patent Publication No. 2010-008837). As described in Japanese Patent Publication No. 2010-008837, such a light emitting device is used as a backlight of a liquid crystal display device, for example, as a direct-type surface light source.

According to Japanese Patent Publication No. 2011-211085, Japanese Patent Publication No. 2011-210674 and Japanese Patent Publication No. 2010-008837, LED elements that are encapsulated in a glass or a resin with a phosphor dispersed therein are connected on a substrate including a circuit pattern, a plurality of holes are provided in a lightguide plate, and the lightguide plate is arranged on the substrate so that the LED elements are located in the holes. In Japanese Patent Publication No. 2011-211085, a metal film as a reflective layer is arranged on the upper surface of a rectangular solid-shaped glass material that encapsulates the LED elements in order to increase the light intensity in the lateral direction of the LED elements. Similarly, in Japanese Patent Publication No. 2011-210674 and Japanese Patent Publication No. 2010-008837, a white reflective layer (a diffusion layer including a titanium oxide dispersed in a resin, etc.) is arranged at positions in holes provided in the lightguide plate that oppose the LED elements encapsulated in a glass or a resin.

Japanese Patent Publication No. 2009-152152 discloses a backlight unit including a light guide unit including a plurality of structures, each including an LED and a light guide, that are connected together via an adhesive. Each light guide has a recess in a central portion on a side that is opposite to the emission surface, and an LED as a light source is arranged in the recess of each light guide. In each light guide, the central portion on the side opposite to the emission surface located on the optical sheet side is made thicker than the edge portion.

SUMMARY

If it is possible to further reduce the thickness of a light emitting device including a plurality of light sources such as LEDs while suppressing the unevenness in luminance, it is beneficial for further reducing the size of an apparatus that includes a light emitting device as a backlight.

A light emitting device according to an embodiment of the present disclosure includes: a lightguide plate including a first surface on which a plurality of first recesses are provided, and a second surface located on an opposite side from the first surface; a light-reflective resin layer that is located on a bottom portion of each first recess; a plurality of light emitting elements each having an upper surface and a lateral surface, wherein each one of the plurality of light emitting elements is arranged in a corresponding one of the plurality of first recesses; and a plurality of wavelength conversion members, wherein: the upper surface of each light emitting element is attached to the light-reflective resin layer; and each of the plurality of wavelength conversion members covers the lateral surface of the light emitting element in the first recess.

An embodiment of the present disclosure provides a light emitting device, e.g., a backlight, whose thickness is further reduced.

DETAILED DESCRIPTION

Embodiments of the present disclosure will now be described in detail with reference to the drawings. The following embodiments are illustrative, and the light emitting device and the light emitting module of the present disclosure are not limited thereto. For example, the numerical values, shapes, materials, steps, and the order of steps, etc., to be shown in the following embodiments are merely examples, and various modifications can be made thereto so long as they do not lead to technical contradictions.

The size, the shape, etc., of the components shown in the figures may be exaggerated for the ease of understanding, and they may not represent the size and the shape of the components, the size relationship therebetween in an actual light emitting device or light emitting module. Some components may be omitted in order to prevent the figures from becoming excessively complicated.

In the following description, components of like functions may be denoted by like reference signs and may not be described redundantly. Terms indicating specific directions and positions (e.g., "upper", "lower", "right", "left", and other terms including such terms) may be used in the following description. Note however that these terms are used merely for the ease of understanding relative directions or positions in the figure being referred to. The arrangement of components in figures from documents other than the present disclosure, actual products, actual manufacturing apparatuses, etc., does not need to be equal to that shown in the figure being referred to, as long as it conforms with the directional or positional relationship as indicated by terms such as "upper" and "lower" in the figure being referred to. In the present disclosure, the term "parallel" encompasses cases where two straight lines, sides, planes, etc., are in the range of about 0±5°, unless otherwise specified. In the present disclosure, the term "perpendicular" or "orthogonal" encompasses cases where two straight lines, sides, planes, etc., are in the range of about 90±5°, unless otherwise specified.

First Embodiment

Figure 1:
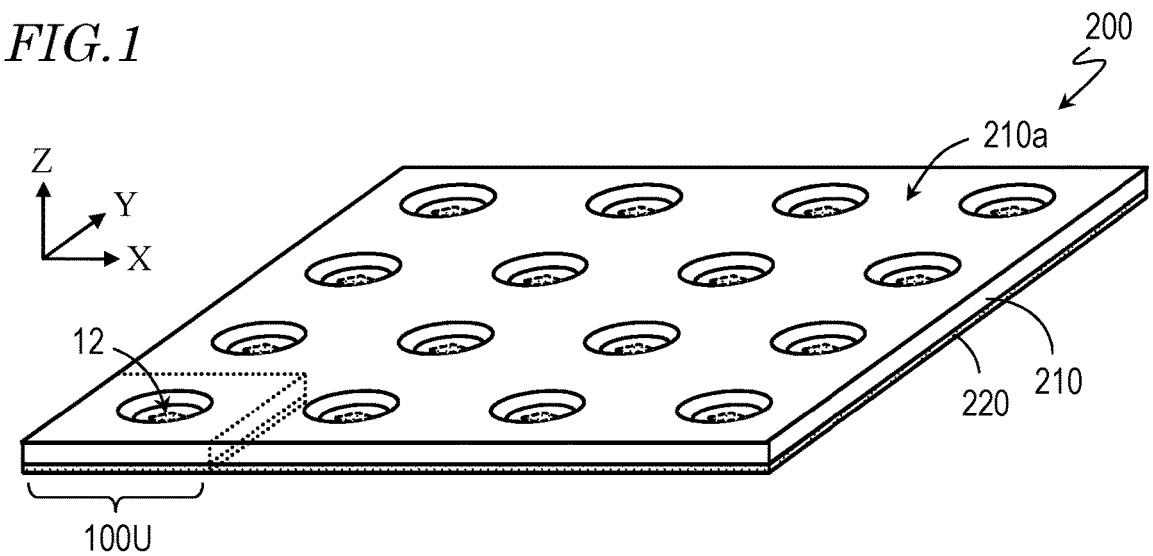
FIG. 1 is a perspective view schematically showing an exemplary configuration of a light emitting device according to a first embodiment of the present disclosure.

FIG. 1 shows an exemplary configuration of a light emitting device according to a first embodiment of the present disclosure. A light emitting device 200 shown in FIG. 1 includes a lightguide plate 210 having an upper surface 210a, and a layer-shaped light-reflective member 220 located under the lightguide plate 210. Note that FIG. 1 also shows arrows in the x direction, the y direction and the Z direction, which are orthogonal to each other, for the purpose of illustration. Arrows indicating these directions may be also shown in other figures of the present disclosure.

As will be later described in detail, a light emitting device according to an embodiment of the present disclosure has a repeating structure including a plurality of units each including at least one light emitting element. For the purpose of illustration, each unit having a light emitting element will be hereinafter referred to as a light emitting cell.

With the configuration illustrated in FIG. 1, the light emitting device 200 includes a total of 16 rectangular light emitting cells 100U. Herein, these light emitting cells 100U are arranged in a matrix pattern of four rows by four columns. There is no limitation on the number of light emitting cells 100U included in the light emitting device 200 and the arrangement of these light emitting cells 100U, and the number and the arrangement are not limited to those shown in FIG. 1. Each light emitting cell 100U includes a portion of the lightguide plate 210 and a portion of the light-reflective member 220.

The lightguide plate 210 includes a plurality of light diffusion structures on the upper surface 210a side. These light diffusion structures are provided so as to correspond to the light emitting cells 100U. In other words, each of the light emitting cells 100U has a light diffusion structure located on the upper surface 210*a* side of the lightguide plate 210. Herein, each light diffusion structure is provided, in the form of a recess 12, in one light emitting cell 100U. Corresponding to the four rows by four columns array of the light emitting cells 100U, the recesses are also in a two-dimensional array. That is, the recesses 12, as the light diffusion structures of the lightguide plate 210, have a two-dimensional array of four rows by four columns on the upper surface 210*a*. However, the arrangement of the light diffusion structures shown in FIG. 1 is merely illustrative, and the recesses 12 may possibly be in a linear array corresponding to a one row by m columns (or n rows by one column) array of the light emitting cells 100U, for example.

Figure 2:
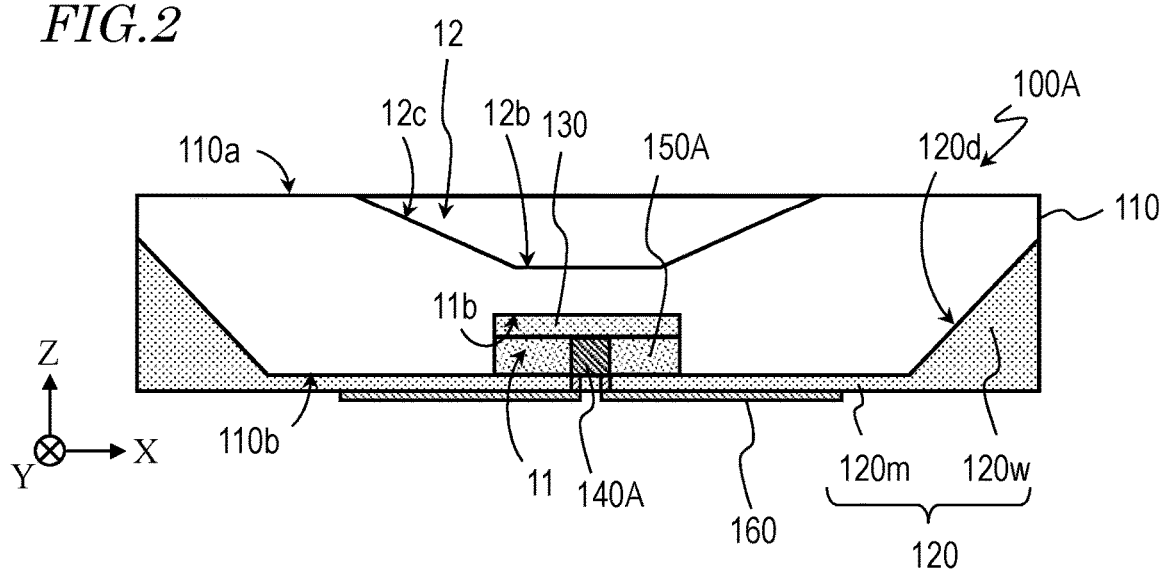
FIG. 2 is a schematic cross-sectional view showing an exemplary configuration of a light emitting cell.

FIG. 2 schematically shows an exemplary configuration of the light emitting cell 100U. A light emitting cell 100A shown in FIG. 2 is an example of the light emitting cell 100U described above. FIG. 2 schematically shows a cross section of the light emitting cell 100A taken along a direction perpendicular to the upper surface 210*a* of the lightguide plate 210. As shown in the figure, the light emitting cell 100A includes a lightguide plate 110 that has an upper surface 110*a* and a lower surface 110*b* located on the opposite side from the upper surface 110*a*, and a light-reflective member 120 that is located on the lower surface 110*b* side of the lightguide plate 110. The lightguide plate 110 and the light-reflective member 120 are a portion of the lightguide plate 210 and a portion of the light-reflective member 220, respectively, which are described above with reference to FIG. 1. Note that in the configuration illustrated in FIG. 2, the light-reflective member 120 includes a layer-shaped base portion 120*m* that covers the lower surface 110*b* of the lightguide plate 110, and a wall portion 120*w* rises from the base portion 120*m* toward the upper surface 110*a* of the lightguide plate 110.

As shown in the figure, the light emitting cell 100A further includes a light-reflective resin layer 130, a light emitting element 140A, a wavelength conversion member 150A, and an interconnect layer 160 on the light-reflective member 120. The components of the light emitting cell 100A will now be described in detail.

[Lightguide Plate 110]

The lightguide plate 110 is a generally plate-shaped light-transmitting member that may be formed of a thermoplastic resin such as acrylic, polycarbonate, cyclic polyolefin, polyethylene terephthalate and polyester, a thermosetting resin such as epoxy and silicone, or glass. Particularly, polycarbonate, among others, can realize a high transparency while being inexpensive. Note that the terms "light-transmitting" and "light transmission" as used herein are understood to encompass diffusiveness for incident light, and not limited to being "transparent". The lightguide plate 110 may have a light diffusion function by including a material dispersed therein that has a different refractive index than that of the base material, for example.

The lightguide plate 110 has the function of diffusing light from the light emitting element 140A to be described below and outputting the diffused light from the upper surface 110*a*. The upper surface 110*a* of the lightguide plate 110 is a portion of the upper surface 210*a* described above. That is, in the present embodiment, a collection of upper surfaces 110*a* forms the light emitting surface through which light is emitted from the light emitting device 200.

The lightguide plate 110 has a light diffusion structure on the upper surface 110*a*. With the light diffusion structure, light that has been emitted from the light emitting element 140A and has entered the lightguide plate 110 is reflected at the interface with an air layer, for example, so as to be diffused in the in-plane direction of the lightguide plate 110. With the provision of the light diffusion structure on the upper surface 110*a* of the lightguide plate 110, the luminance improves for the area of the upper surface 110*a* excluding the area directly above the light emitting element 140A, and it allows to effectively suppress the unevenness in luminance across the upper surface 110*a* of the lightguide plate, in other words, the upper surface of the light emitting cell 100A. That is, the light diffusion structure contributes to the reduction in thickness of the lightguide plate 110. The thickness of the lightguide plate 110 is typically about 0.1 mm or more and 5 mm or less, and it may be in the range of about 0.5 mm or more and 3 mm or less according to an embodiment of the present disclosure.

With the configuration illustrated in FIG. 2, the light diffusion structure is provided on the upper surface 110*a* of the lightguide plate 110 in the form of a recess 12 of an inverted truncated cone shape having a bottom surface 12*b* and a lateral surface 12*c*. With the recess 12, light traveling through the lightguide plate 110 toward the upper surface 110*a* is reflected by the sloped interface between the lateral surface 12*c* and the air layer. The cross-sectional shape of the bottom surface 12*b* and the lateral surface 12*c* is not limited to a linear shape as shown in the figure, but it may be a curved shape or a shape with a bend or a step. The inside of the recess 12 may be filled with a material having a different refractive index than that of the material of the lightguide plate 110 itself. Alternatively, a light-reflective member such as a reflective film of a metal, or the like, or a white resin layer may be arranged on the bottom surface 12*b* and the lateral surface 12*c*.

The specific configuration of the light diffusion structure is not limited to the structure of the recess 12 shown in FIG. 2. The specific configuration of the light diffusion structure can be appropriately determined depending on the shape, characteristics, etc., of the light emitting elements arranged on the lower surface 110*b* side of the lightguide plate 110. Also when the light diffusion structure is provided in the form of a recess, the shape of the recess is not limited to an inverted truncated cone shape, but may be changed as necessary depending on the target optical characteristics. For example, the shape of the recess 12 may be a cone or a polygonal pyramid such as a quadrangular pyramid or a hexagonal pyramid, or a truncated polygonal pyramid, etc. The depth of the recess 12 is in the range of 0.05 mm or more and 3 mm or less, for example. A protruding portion that projects from the upper surface 110*a* may also be used as the light diffusion structure, instead of a recess.

The lightguide plate 110 may be a single layer, or may have a layered structure including a plurality of light-transmitting layers. When a plurality of light-transmitting layers are layered together, a layer having a different refractive index, e.g., an air layer, or the like, may be provided between any layers. With the provision of an air layer, for example, between any layers of the layered structure, it may be easier to diffuse light from the light emitting element 140A and it allows to further reduce the unevenness in luminance.

The lightguide plate 110 may further include a recess 11 on the lower surface 110*b* side. In the configuration illustrated in FIG. 2, a portion of the light emitting element 140A, the light-reflective resin layer 130 and the wavelength conversion member 150A are located in the recess 11. As can be seen from FIG. 2, the recess 11 is typically located directly under a corresponding one of the recesses 12 described above. That is, corresponding to the two-dimensional array of a plurality of light diffusion structures on the upper surface 210a of the lightguide plate 210, a plurality of recesses 11 are arranged in a two-dimensional array on the principal surface (lower surface) on the opposite side from the upper surface 210a of the lightguide plate 210. Needless to say, depending on the arrangement of the light diffusion structures, the recesses may be arranged in a row, for example, on the lower surface side of the lightguide plate 210.

Figure 3:
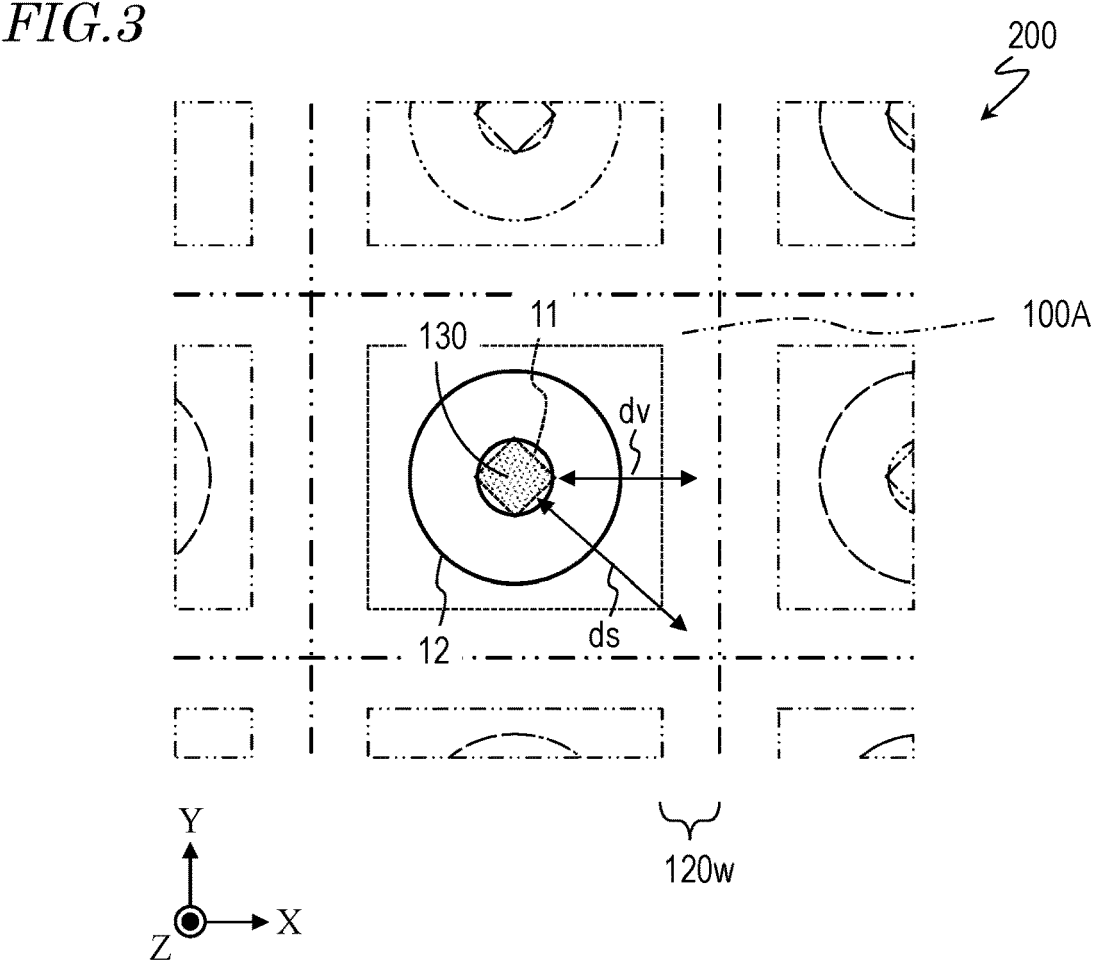
FIG. 3 is a schematic plan view showing an example appearance of a light emitting cell as seen from the direction normal to the upper surface of a lightguide plate.

FIG. 3 shows an example appearance of the light emitting cell 100A as seen from the direction normal to the upper surface 210a of the lightguide plate 210. With the configuration illustrated in FIG. 3, the light emitting cell 100A has a quadrangular outer shape. Accordingly, the lightguide plate 210, as a collection of the lightguide plates 110 of the light emitting cells 100A, may also have a rectangular shape as a whole. Herein, the x direction and the y direction described above coincide respectively with one side and another side, orthogonal to each other, of the rectangular shape of the lightguide plate 210 (see FIG. 1).

The length of one side of the rectangular shape of the upper surface 210a of the lightguide plate 210, which forms the light emitting surface of the light emitting device 200, may be in the range of 1 cm or more and 200 cm or less, for example. In a typical embodiment of the present disclosure, one side of the rectangular shape of the upper surface 210a of the lightguide plate 210 has a length of 20 mm or more and 25 mm or less.

In the example shown in FIG. 3, the recess 11 provided on the lower surface 110b side of the lightguide plate 110 has a square outer shape. That is, in this example, the recess 11 is a hole of a quadrangular prism shape. Thus, the recess 11 may have an outer shape that is similar to the outer shape of the lightguide plate 110. Typically, the center of the recess 11, as the first recess, located on the lower surface 110b side of the lightguide plate 110 generally coincides with the center of the recess 12, as the second recess, located on the upper surface 110a side.

The length along the diagonal direction of the rectangular bottom surface (or opening) of the recess 11 shown in FIG. 3 may be 0.05 mm or more and 10 mm or less, and preferably 0.1 mm or more and 1 mm or less, for example. The length in the diagonal direction of the bottom surface of the quadrangular prism shape may be generally equal to the diameter of the bottom surface 12b of the recess 12 provided on the upper surface 110a side of the lightguide plate 110. The shape and the size of the recess 11 may be determined appropriately depending on the target optical characteristics.

When the shape of the recess 11 as seen from above has a rectangular shape, it is not necessary that one side of the rectangular shape of the recess 11 be parallel to one side of the rectangular shape of the lightguide plate 110. For example, the rectangular shape of the recess 11 may be inclined by 45° relative to the rectangular shape of the lightguide plate 110. That is, the recess 11 may be provided on the lower surface 110b of the lightguide plate 110 so that each side of the rectangular outer shape of the recess 11 is generally parallel to the diagonal line of the rectangular shape of the lightguide plate 110, as schematically shown in FIG. 3. By inclining the rectangular shape of the recess 11 by 45° relative to the rectangular shape of the lightguide plate 110 as illustrated in FIG. 3, each side of the rectangular shape of the recess 11 opposes a corner of the rectangular shape of the lightguide plate 110.

When the shape of the recess 11 as seen from above is a rectangular shape, the amount of light emitted from the recess 11 toward the direction in which the diagonal line of the rectangular shape of the recess 11 extends is typically likely to be smaller than the amount of light emitted in the direction perpendicular to a side of the rectangular shape of the recess 11. Therefore, if one side of the rectangular shape of the lightguide plate 110 were parallel to one side of the rectangular shape of the recess 11, the luminance at the four corners of the upper surface 110a as the lightguide plate 110 is seen from the upper surface 110a side might become relatively small. In contrast, if the recess 11 is formed with one side of the rectangular shape being inclined relative to one side of the rectangular shape of the lightguide plate 110 as in the example of FIG. 3, it is possible to reduce the distance (indicated by double-headed arrow dv in FIG. 3) from a corner of the rectangular shape of the recess 11 to the wall portion 120w of the light-reflective member 120 while increasing the distance (indicated by double-headed arrow ds in FIG. 3) from one side of the rectangular shape of the recess 11 to a part of the wall portion 120w that locates near a corner of the upper surface 110a of the lightguide plate 110.

As will be later described in detail, the wall portion 120w of the light-reflective member 120 has a slope 120d that is inclined relative to the lower surface 110b of the lightguide plate 110. The slope 120d formed on the wall portion 120w may serve as a reflective surface that reflects the incident light toward the upper surface 110a of the lightguide plate 110. Therefore, by inclining the rectangular shape of the recess 11 by 45°, for example, relative to the rectangular shape of the lightguide plate 110 as shown in FIG. 3, it is possible to relatively lower the luminance near the center of each side of the rectangular shape of the lightguide plate 110 while improving the luminance at the four corner portions thereof. In other words, as compared with a case where the recess 11 is formed so that one side of the rectangular shape of the recess 11 is parallel to one side of the rectangular shape of the lightguide plate 110, it is possible to reduce the difference between the luminance at four corner portions of the rectangular shape of the lightguide plate 110 and the luminance near the center of each side of the rectangular shape of the lightguide plate 110. Therefore, it is possible to suppress the unevenness in luminance across the upper surface 110a of the lightguide plate 110.

The shape of the recess 11 as seen from above may be a circular shape as well as a rectangular shape as shown in FIG. 3. When the recess 11 has a cylindrical shape, for example, the diameter of the bottom surface of the cylindrical shape may be generally equal to the diameter of the bottom surface 12b of the truncated cone shape of the recess 12 provided on the upper surface 110a side of the lightguide plate 110.

[Light-Reflective Resin Layer 130]

Reference will be made again to FIG. 2. In the example shown in FIG. 2, the light-reflective resin layer 130 is arranged in each of the recesses 11. As shown in FIG. 2, the light-reflective resin layer 130 is located on the bottom portion of the recess 11. Herein, the term "bottom portion of the recess 11" refers to a portion that corresponds to the bottom of the recess 11 as considered to be a hole, with the lower surface 110b of the lightguide plate 110 facing up. Herein, the light-reflective resin layer 130 is arranged on a bottom surface 11b, among other surfaces defining the recess 11, that oppose the bottom surface 12b of the recess 12 on the upper surface 110a side. Thus, terms "bottom portion" and "bottom surface" may be used herein without being bound by the orientation of the light emitting device depicted in the figure. When the light emitting cell 100A is in the orientation shown in FIG. 2, the bottom portion of the recess 11 can also be said to be a ceiling portion of the dome-shaped structure formed on the lower surface 110b side of the lightguide plate 110.

The light-reflective resin layer 130 is formed from a light-reflective material, and is located between the bottom surface 11b of the recess 11 and the light emitting element 140A. The term "light-reflective" as used herein means that the reflectivity is 60% or more at the emission peak wavelength of the light emitting element 140A. The reflectivity of the light-reflective resin layer 130 at the emission peak wavelength of the light emitting element 140A is preferably 70% or more, and more preferably 80% or more.

The material of the light-reflective resin layer 130 may be a resin material with a light-reflective filler dispersed therein, for example. The base material of a resin material used for forming the light-reflective resin layer 130 may be a silicone resin, a phenolic resin, an epoxy resin, a BT resin, a polyphthalamide (PPA), etc. The light-reflective filler may be metal particles, or particles of an inorganic material or an organic material having a higher refractive index than that of the base material in which the light-reflective filler is dispersed. Examples of the light-reflective filler include particles of titanium dioxide, silicon oxide, zirconium dioxide, potassium titanate, aluminum oxide, aluminum nitride, boron nitride, mullite, niobium oxide, barium sulfate, or particles of various rare earth oxides such as yttrium oxide and gadolinium oxide. It is advantageous that the light-reflective resin layer 130 is white.

By arranging the light-reflective resin layer 130 over the light emitting element 140A, light that is emitted from the light emitting element 140A and travels near the center of the lightguide plate 110 toward the upper surface 110a of the lightguide plate 110 may be reflected by the light-reflective resin layer 130. Therefore, light emitted from the light emitting element 140A may be efficiently diffused in the in-plane direction of the lightguide plate 110. It is possible to prevent the luminance in an area of the upper surface 110a of the lightguide plate 110 that is directly above the light emitting element 140A from becoming locally significantly high. Note however that it is not necessary for the light-reflective resin layer 130 to completely shield light from the light emitting element 140A. In this sense, the light-reflective resin layer 130 may have a semi-transmissive property such that a portion of light from the light emitting element 140A is transmitted therethrough.

[Light Emitting Element 140A]

Figure 4:
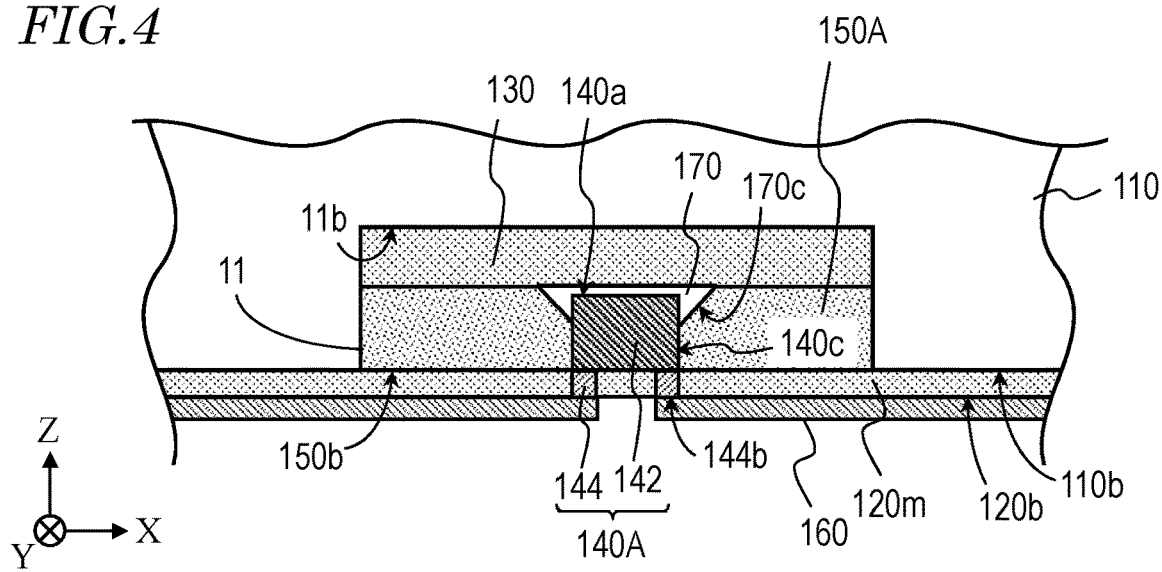
FIG. 4 is a schematic enlarged view showing the light emitting element of FIG. 2 and the vicinity thereof.

FIG. 4 shows, on an enlarged scale, the light emitting element 140A of FIG. 2 and the vicinity thereof. As shown in FIG. 4, the light emitting element 140A is located in the recess 11 of the lightguide plate 110. That is, the light emitting device 200 includes a plurality of light emitting elements 140A corresponding to the provision of a plurality of recesses 11 on the lightguide plate 210. Each recess 11 is located directly under a corresponding one of the recesses 12 on the upper surface 110a side of the lightguide plate 110. Therefore, each light emitting element 140A is located directly under a corresponding one of the light diffusion structures provided on the upper surface 210a side of the lightguide plate 210.

A typical example of the light emitting element 140A is an LED. In the configuration illustrated in FIG. 4, the light emitting element 140A includes a main body 142, and an electrode 144 located on the opposite side from an upper surface 140a of the light emitting element 140A. For example, the main body 142 includes a support substrate of sapphire or gallium nitride, etc., and a semiconductor layered structure on the support substrate. The semiconductor layered structure includes an active layer, and an n-type semiconductor layer and a p-type semiconductor layer with the active layer sandwiched therebetween. The semiconductor layered structure may include a nitride semiconductor ($In_xAl_yGa_{1-x-y}N$, $0≤x$, $0≤y$, $x≤y≤1$) capable of emitting light in the ultraviolet to visible range. In this example, the upper surface 140a of the light emitting element 140A coincides with the upper surface of the main body 142. The electrode 144 includes a pair of a positive electrode and a negative electrode, and has the function of supplying a predetermined current to the semiconductor layered structure.

The light emitting elements 140A provided in the light emitting device 200 may each be an element that emits blue light or may be an element that emits white light. The light emitting elements 140A may include elements that emit light of different colors from each other. For example, the light emitting elements 140A may include elements that emit red light, elements that emit blue light, and elements that emit green light. Herein, an LED that emits blue light is shown as an example of the light emitting element 140A.

Each light emitting element 140A is attached to a corresponding one of the light-reflective resin layers 130 arranged in the recesses 11 provided on the lightguide plate 210. In this example, the light emitting element 140A is secured at a predetermined position in the recess 11 with the upper surface 140a thereof is attached to the light-reflective resin layer 130 with a bonding member 170 interposed therebetween. The details of the bonding member 170 will be described below.

The shape of the light emitting element 140A as seen from above is typically a rectangular shape. The length of each side of the rectangular shape of the light emitting element 140A is 1000 µm or less, for example. The size along the x or y direction of the rectangular shape of the light emitting element 140A may be 500 µm or less. Light emitting elements whose size along the x or y direction is 500 µm or less can be procured at low cost. Alternatively, size along the x or y direction of the rectangular shape of the light emitting element 140A may be 200 µm or less. When the light emitting element 140A is applied to a backlight unit of a liquid crystal display device, the length of each side of the rectangular shape of the light emitting element 140A is preferably small for rendering high-definition images and actuating local dimming, for example. Particularly, with a light emitting element of which the size along the y direction and the size along the x direction are both 250 µm or less, the area of the upper surface is small, thereby relatively increasing the amount of light emission from the lateral surface of the light emitting element. Therefore, it is easy to obtain a batwing light distribution characteristic. Herein, a batwing light distribution characteristic generally refers to a light distribution characteristic that is defined as an emission intensity distribution such that the emission intensity is higher at angles at which the absolute value of the light distribution angle is greater than 0°, where 0° is the optical axis that is perpendicular to the upper surface of the light emitting element.

Particularly, if the shape of the light emitting element 140A as seen from above is a rectangular shape, when a plurality of light emitting elements 140A are arranged two-dimensionally on the lightguide plate 210, it is easier to detect an in-plane rotation of a light emitting element with respect to a predetermined reference direction, in other words, a misalignment between the predetermined reference direction and the long side, for example, of the rectangular shape of the light emitting element. Moreover, a positive electrode and a negative electrode may be formed apart from each other on the opposite side from the upper surface 140a of the light emitting element 140A, and the interconnect layer 160, which includes an interconnect connected to the positive electrode and an interconnect connected to the negative electrode, can be easily formed on the light-reflective member 120. Note that it is not necessary for the predetermined reference direction to be parallel to one side of the rectangular shape of the recess 11 or one side of the rectangular shape of the lightguide plate 110.

In the light emitting device 200, a plurality of light emitting elements 140A are arranged two-dimensionally along the x direction and the y direction. The arrangement pitch of the light emitting elements 140A may be set to about 0.05 mm or more and 20 mm or less, for example, and may be in the range of about 1 mm or more and 10 mm or less. The arrangement pitch of the light emitting elements 140A as used herein refers to the distance between the optical axes of the light emitting elements 140A. The light emitting elements 140A may be arranged at regular intervals or may be arranged at irregular intervals. The arrangement pitch of the light emitting elements 140A may be the same or different between the two directions, which are different from each other. The number and the arrangement of the light emitting elements 140A are not limited to those of the example described above with reference to FIG. 1, and may be any number and any arrangement.

[Bonding Member 170]

The bonding member 170 is a light-transmitting member that covers at least a portion of a lateral surface 140c of the light emitting element 140A. As schematically shown in FIG. 4, the bonding member 170 typically has a layer-shaped portion that is located between the upper surface 140a of the light emitting element 140A and the light-reflective resin layer 130. In the present embodiment, one bonding member 170 is arranged on the light-reflective resin layer 130 so as to correspond to the light-reflective resin layer 130 arranged in each recess 11. Thus, the light emitting element 140A may be attached to a corresponding one of the light-reflective resin layers 130 by one of the bonding members 170.

The material of the bonding member 170 may be a resin composition that includes a transparent resin material as the base material. The bonding member 170 has a transmittance of 60% or more, for example, for light having the emission peak wavelength of the light emitting element 140A. In view of the effective use of light, the transmittance of the bonding member 170 at the emission peak wavelength of the light emitting element 140A is preferably 70% or more, and more preferably 80% or more.

A typical example of the base material of the bonding member 170 is a thermosetting resin such as an epoxy resin or a silicone resin. The base material of the bonding member 170 may be a silicone resin, a modified silicone resin, an epoxy resin, a phenol resin, a polycarbonate resin, an acrylic resin, a polymethylpentene resin or a polynorbornene resin, or a material including two or more of these materials. The bonding member 170 may be given a light diffusion function by including, dispersed therein, a material having a different refractive index than that of the base material, for example.

As described above, the bonding member 170 covers at least a portion of the lateral surface 140c of the light emitting element 140A. The bonding member 170 has an outer surface 170c, which is the interface with the wavelength conversion member 150A to be described later. Light that is emitted from the lateral surface 140c of the light emitting element 140A to enter the bonding member 170 is reflected, at the position of the outer surface 170c, toward above the light emitting element 140A. Note however that since the light-reflective resin layer 130 is located on the bottom portion of the recess 11, light traveling toward above the light emitting element 140A is further reflected by the light-reflective resin layer 130 to eventually enter the wavelength conversion member 150A. Light that returns to the wavelength conversion member 150A propagates in the in-plane direction of the lightguide plate 110 between the base portion 120m of the light-reflective member 120 and the light-reflective resin layer 130.

The shape of the outer surface 170c of the bonding member 170 as seen in a cross section is not limited to a linear shape as shown in FIG. 4. The shape of the outer surface 170c as seen in a cross section may be a zigzag line, a curved line that protrudes toward the light emitting element 140A, a curved line that protrudes away from the light emitting element 140A, etc.

[Wavelength Conversion Member 150A]

In the configuration illustrated in FIG. 4, the wavelength conversion member 150A occupies a portion of the inside of the recess 11 that excludes the light-reflective resin layer 130, the light emitting element 140A and the bonding member 170. As schematically shown in FIG. 4, the wavelength conversion member 150A arranged in each recess 11 covers the lateral surface 140c of the light emitting element 140A in the recess 11. Note that to "cover" as used herein is not limited to embodiments where the covered member and the covering member are in direct contact with each other, but includes embodiments where another member is interposed therebetween. In this example, the bonding member 170 is interposed between a portion of the lateral surface 140c of the light emitting element 140A and the wavelength conversion member 150A. Note however that the wavelength conversion member 150A also covers the entire outer surface 170c of the bonding member 170, and it can be said that the four lateral surfaces 140c of the light emitting element 140A are entirely covered by the wavelength conversion member 150A.

As shown in the figure, it is beneficial that the wavelength conversion member 150A is in contact with the light-reflective resin layer 130 in the recess 11. With the light-reflective resin layer 130 arranged adjacent to the wavelength conversion member 150A in the recess 11, light emitted from the lateral surface 140c of the light emitting element 140A and traveling toward the wavelength conversion member 150A, and light emitted from the outer surface 170c of the bonding member 170 and traveling toward the wavelength conversion member 150A may be reflected at the position of the interface between the light-reflective resin layer 130 and the wavelength conversion member 150A to return the light to the wavelength conversion member 150A.

The wavelength conversion member 150A is typically a member including particles of a phosphor dispersed in a resin. The wavelength conversion member 150A absorbs at least a portion of light emitted from the light emitting element 140A and outputs light having a wavelength that is different from the wavelength of the light from the light emitting element 140A. For example, the wavelength conversion member 150A converts a portion of blue light from the light emitting element 140A to output yellow light. With such a configuration, blue light having passed through the wavelength conversion member 150A and yellow light emitted from the wavelength conversion member 150A are mixed together, thereby obtaining white light. Particularly, in this example, the wavelength conversion member 150A covers the lateral surface 140c of the light emitting element 140A and the outer surface 170c of the bonding member 170, and is located between the base portion 120m of the light-reflective member 120 and the light-reflective resin layer 130. Thus, light obtained by color-mixing with wavelength-converted light can be effectively diffused in the in-plane direction of the lightguide plate 110, and one can expect the effect of suppressing the unevenness in emission color. Thus, the embodiment of the present disclosure is advantageous in achieving uniform light as compared with a case where light is first diffused in the lightguide plate and then the wavelength thereof is converted.

The resin in which particles of a phosphor, or the like, are dispersed may be a silicone resin, a modified silicone resin, an epoxy resin, a modified epoxy resin, a urea resin, a phenol resin, an acrylic resin, a urethane resin or a fluorine resin, or a resin that includes two or more of these resins. In view of introducing light efficiently into the lightguide plate 110, the base material of the wavelength conversion member 150A preferably has a lower refractive index than that of the base material of the lightguide plate 110. The wavelength conversion member 150A may be given the light diffusion function by dispersing a material having a different refractive index than that of the base material in the material of the wavelength conversion member 150A. For example, particles of titanium dioxide, silicon oxide, etc., may be dispersed in the base material of the wavelength conversion member 150A.

A known material may be used as the phosphor. Examples of the phosphor include a YAG-based phosphor, a fluoride-based phosphor such as a KSF-based phosphor, a nitride-based phosphor such as CASN, and a β-SiAlON phosphor. A YAG-based phosphor is an example of a wavelength conversion substance that converts blue light into yellow light, a KSF-based phosphor and CASN is an example of a wavelength conversion substance that converts blue light into red light, and a β-SiAlON phosphor is an example of a wavelength conversion substance that converts blue light into green light. The phosphor may be a quantum dot phosphor.

It is not necessary that the phosphor included in the wavelength conversion member 150A be the same phosphor across one light emitting device 200. The phosphor dispersed in the base material may vary between different recesses 11 in one light emitting device 200. For example, a wavelength conversion member that converts incident blue light into yellow light may be arranged in some of the recesses 11 while a wavelength conversion member that converts incident blue light into green light may be arranged in some other ones of the recesses 11. Moreover, a wavelength conversion member that converts incident blue light into red light may be arranged in the rest of the recesses 11.

[Light-Reflective Member 120]

As shown in FIG. 4, the lower surface 110b of the lightguide plate 110 and a lower surface 150b of the wavelength conversion member 150A may be covered by the light-reflective member 120. As described above with reference to FIG. 2, the light-reflective member 120 includes the layer-shaped base portion 120m located on the lower surface 110b side of the lightguide plate 110. In this example, the base portion 120m of the light-reflective member 120 covers an area of the light emitting element 140A excluding the electrode 144, as well as the lower surface 110b of the lightguide plate 110 and the lower surface 150b of the wavelength conversion member 150A. That is, as schematically shown in FIG. 4, the base portion 120m of the light-reflective member 120 covers the lateral surface of the electrode 144, whereas a lower surface 144b of the electrode 144 is exposed from a lower surface 120b of the light-reflective member 120.

The material of the light-reflective member 120 may be a material similar to that of the light-reflective resin layer 130. Thus, the light-reflective member 120 serves as a light-reflective layer that reflects incident light toward the lightguide plate 110. Particularly, the base portion 120m of the light-reflective member 120 reflects the incident light toward the upper surface 110a side of the lightguide plate 110. By covering the lower surface 110b side of the lightguide plate 110 with the light-reflective member 120, it is possible to suppress light leakage from the lower surface side of the light emitting cell 100A, in other words, from the lower surface 110b of the lightguide plate 110. Thus, it is possible to improve the light efficiency. Moreover, by forming the base portion 120m of the light-reflective member 120 in a layer shape on the lower surface 110b side of the lightguide plate 110, one can expect the effect of preventing the light emitting element 140A from coming off the lightguide plate 110, and reinforcing the lightguide plate 110, etc.

As shown in FIG. 2, the light-reflective member 120 also includes the wall portion 120w that projects from the lower surface 110b side toward the upper surface 110a side of the lightguide plate 110. In the example shown in FIG. 2, the wall portion 120w has the slope 120d that is inclined relative to the upper surface of the base portion 120m, i.e., the lower surface 110b of the lightguide plate 110. As can be seen from FIG. 3, the slope 120d surrounds the light emitting element 140A in a rectangular pattern.

As already described with reference to FIG. 3, the slope 120d of the wall portion 120w has the function of reflecting the incident light toward the upper surface 110a of the lightguide plate 110. Thus, by arranging the wall portion 120w having the slope 120d in the peripheral portion of the lightguide plate 110, it is possible to prevent the luminance in the peripheral portion of the lightguide plate 110 from becoming lower than that in the central portion.

[Interconnect Layer 160]

The interconnect layer 160 includes wirings that are located on the lower surface 120b of the light-reflective member 120 and are each connected to the electrode 144 of each light emitting element 140A. The interconnect layer 160 is typically a single-layer film or a layered film formed from a metal such as Cu. Being connected to the power supply (not shown), or the like, the interconnect layer 160 has the function of supplying a predetermined current to each light emitting element 140A.

By providing the interconnect layer 160 on the back side of the light emitting device 200, a plurality of light emitting elements 140A in the light emitting device 200 may be electrically connected to each other by the interconnect layer 160, for example. That is, the light emitting elements 140A may be driven by the unit of a light emitting device 200, for example. By assembling a plurality of light emitting devices 200 to form a light emitting module as will be described below, the light emitting module can be locally dimmed. Needless to say, the light emitting elements 140A may be driven by the unit of one or more light emitting cell 100A.

According to embodiments of the present disclosure, a plurality of light emitting elements are arranged two-dimensionally, for example, on the opposite side from the upper surface 210a of the lightguide plate 210, which forms the light emitting surface, and are optically coupled to the lightguide plate 210, and it is possible to provide a thinner surface light source. Particularly, it is possible to realize an even smaller thickness by providing a plurality of recesses 11 on the opposite side from the upper surface 210a of the lightguide plate 210, arranging the light-reflective resin layer 130 in each recess 11, and arranging a light emitting element on the light-reflective resin layer 130. That is, it is possible to diffuse light from the light emitting element in the in-plane direction of the lightguide plate 210 while suppressing a significant increase in the luminance at a position directly above the light emitting element by the reflection of light at the light-reflective resin layer 130. Thus, it is possible to realize a small thickness while providing uniform light.

According to the embodiments of the present disclosure, the thickness of the structure including the light-reflective member 120, in other words, the distance from the lower surface of the electrode of the light emitting element to the upper surface 210a of the lightguide plate 210, may be reduced to 5 mm or less, 3 mm or less, or 1 mm or less, for example. The distance from the lower surface of the electrode of the light emitting element to the upper surface 210a of the lightguide plate 210 may be about 0.7 mm or more and 1.1 mm or less.

Moreover, by covering the light emitting element, excluding the electrode, with the wavelength conversion member 150A by filling the recess 11 with the wavelength conversion member 150A, color-mixed light can be emitted from the upper surface 210a of the lightguide plate 210 after being diffused in the in-plane direction of the lightguide plate 210. Therefore, it is possible to obtain more uniform white light, for example, by suppressing the unevenness in emission color across the upper surface 210a. By providing the light diffusion structure on the upper surface 210a side of the lightguide plate 210 so as to correspond to the position of each light emitting element as described above with reference to FIG. 1, etc., light traveling toward an area directly above the light emitting element can be more effectively diffused in the in-plane direction of the lightguide plate 210 by the light diffusion structure. Thus, with the light diffusion structure, it is possible to realize the effect of more efficiently making the light uniform. By providing the light diffusion structure, e.g., in the form of a recess, on the upper surface 210a side of the lightguide plate 210, light traveling toward an area directly above the light emitting element may be diffused in the in-plane direction of the lightguide plate 210 through reflection at the lateral surface that defines the recess.

By further providing the light-reflective member 120 on the opposite side from the upper surface 210a of the lightguide plate 210 as in the example described above, light traveling toward the lower surface side of the light emitting device may be reflected by the light-reflective member 120, and it is possible to suppress light leakage from the lower surface side of the light emitting device. Thus, it is possible to improve the light efficiency. By forming the wall portion 120w having a slope that rises toward the upper surface 210a of the lightguide plate 210 on the light-reflective member 120, light can be more efficiently extracted from the upper surface 210a by virtue of the reflection of light at the position of the slope.

Particularly, when the shape of the lightguide plate 110 of each light emitting cell as seen from above and the shape of each of the recesses 11 provided on the lower surface 110b side of the lightguide plate 110 as seen from above are both rectangular, each side of the rectangular outer shape of the recess 11 may be generally parallel to the diagonal line of the rectangular shape of the lightguide plate 110. By employing such an arrangement of the recesses 11, it is possible to reduce the difference between the luminance in the direction of the diagonal line of the rectangular shape of the lightguide plate 110 and the luminance in the direction along the side of the rectangular shape, as seen from the upper surface 110a side of the lightguide plate 110.

As illustrated in FIG. 2, etc., the interconnect layer 160 including wirings electrically connected to the light emitting elements may be provided on the light-reflective member 120. By employing such a configuration, there is no need to form an electrical connection between each of the light emitting elements and the wiring board, and it is possible to obtain the electrical connection with the light emitting elements at once by connecting the interconnect layer 160 to a power supply. That is, with the light emitting device according to the embodiments of the present disclosure, it is possible to easily connect the power source, the driver circuit, etc., with the light emitting elements, and it is possible to easily realize an intended operation by connecting the power supply, the driver circuit, etc., to the interconnect layer 160.

(First Variation)

Figure 5:
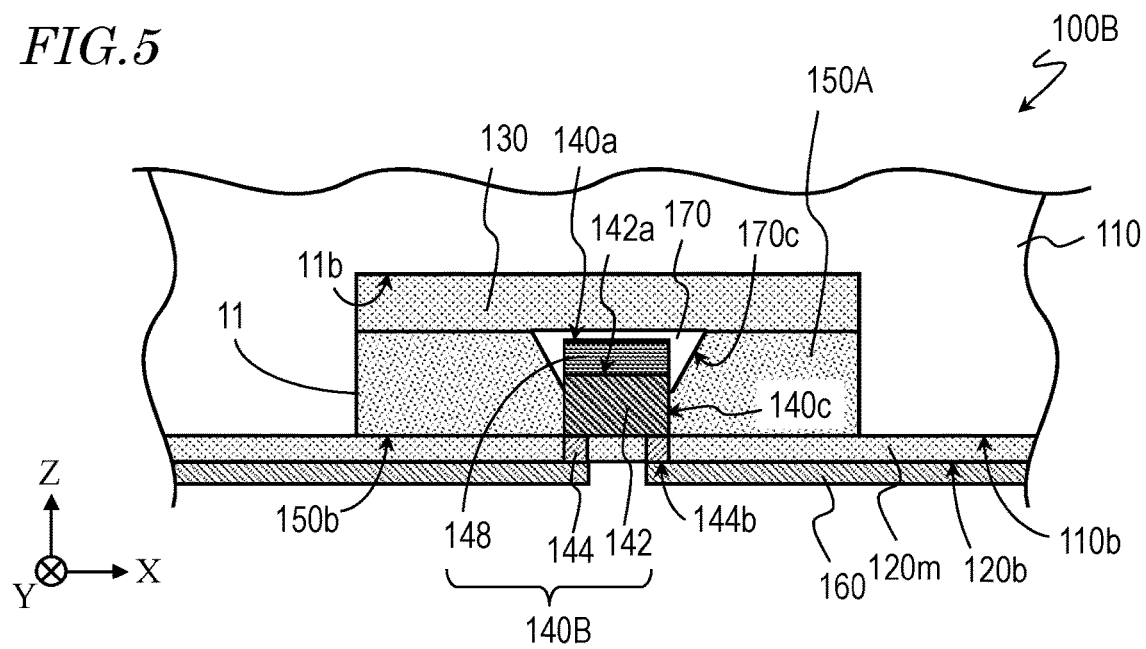
FIG. 5 is a schematic cross-sectional view showing a variation of the light emitting device according to the first embodiment of the present disclosure.

FIG. 5 shows a light emitting device according to a variation of the first embodiment of the present disclosure. As in FIG. 4, FIG. 5 shows only a portion of the light emitting cell including the light emitting element and the vicinity thereof.

The main difference between a light emitting cell 100B shown in FIG. 5 and the light emitting cell 100A described above with reference to FIG. 2 to FIG. 4 is that the light emitting cell 100B includes a light emitting element 140B, instead of the light emitting element 140A, arranged in the recess 11 of the lightguide plate 110.

With the configuration illustrated in FIG. 5, the light emitting element 140B includes a reflective film 148 on an upper surface 142a of the main body 142. Therefore, in this example, at least a portion of the light-reflective resin layer 130 described above is located between the reflective film 148 of the light emitting element 140B and the bottom surface 11b forming the bottom portion of the recess 11. Each of the light emitting elements 140B may also be secured in the corresponding recess 11 with the bonding member 170 interposed therebetween in a similar manner to that of the light emitting element 140A described above. In this example, the upper surface 140a of the light emitting element 140B is attached to the light-reflective resin layer 130 with the bonding member 170 interposed therebetween.

The reflective film 148 is a multilayer dielectric film, for example. The reflective film 148 may be a metal film or may be a semi-transmissive film of a ceramic such as aluminum oxide. By providing the reflective film 148 on the upper surface 142a of the main body 142, it is possible to realize a batwing light distribution characteristic by suppressing the amount of light directly above the light emitting element 140B. That is, it is possible to reduce the light that directly reaches the upper surface 110a of the lightguide plate 110 from the upper surface 142a of the main body 142, and it is possible to more effectively suppress the unevenness in luminance across the upper surface 110a of the lightguide plate 110. Note that when the reflective film 148 is provided on the upper surface 142a of the main body 142, the light-reflective resin layer 130 may be omitted. That is, in the present embodiment, the light-reflective resin layer 130 is optional.

(Exemplary Method for Manufacturing Light Emitting Device)

Now, an exemplary method for manufacturing the light emitting device according to the first embodiment of the present disclosure will be outlined.

Figure 6:
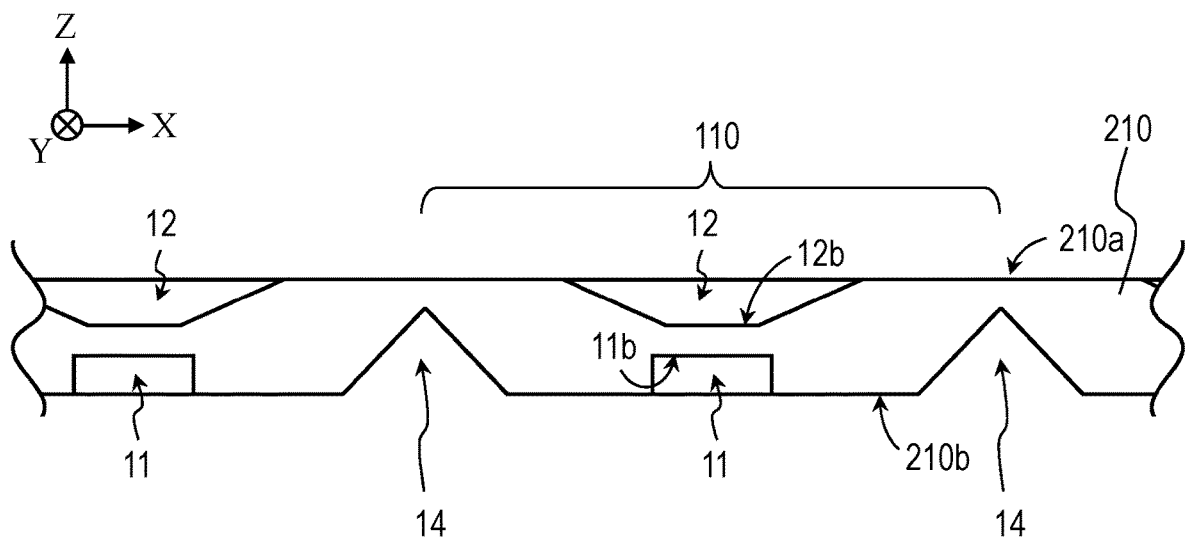
FIG. 6 is a schematic cross-sectional view illustrating an exemplary method for manufacturing the light emitting device according to the first embodiment of the present disclosure.

First, as shown in FIG. 6, the lightguide plate 210 having a two-dimensional array of recesses 11 on one principal surface is provided. The lightguide plate 210 may be formed by injection molding using a material that includes polycarbonate as the base material, for example. A thermoplastic resin material, from among the materials listed above, is preferred because it is then possible to efficiently manufacture the lightguide plate 210 by injection molding. It is possible to add the light diffusion function to the lightguide plate 210 by dispersing a material having a different refractive index than the base material in the base material. The lightguide plate 210 may be formed by transfer molding, thermal transfer, etc., instead of injection molding.

With the configuration illustrated in FIG. 6, the lightguide plate 210 includes a plurality of recesses 12, as light diffusion structures, arranged two-dimensionally on the upper surface 210a side. The lightguide plate 210 includes a plurality of recesses 11 on a lower surface 210b, which is the principal surface on the opposite side from the upper surface 210a. Typically, each of the recesses 11 is formed directly under a corresponding one of the recesses 12 located on the upper surface 210a side. That is, the lower surface 210b of the lightguide plate 210 has a two-dimensional array of recesses 11, and the bottom surface 12b of the recess 12 on the upper surface 210a side and the bottom surface 11b of the recess 11 on the lower surface 210b side oppose each other. In the illustrated example, the lightguide plate 210 can be said to be a two-dimensional array of lightguide plates 110, which are unit structures each including the recess 11 and the recess 12.

Moreover, in this example, the lightguide plate 210 has a plurality of grooves 14 on the lower surface 210b side. Each groove 14 is located between two unit structures adjacent to each other, in other words, between two lightguide plates 110 adjacent to each other. Herein, corresponding to the two-dimensional array of lightguide plates 110, a collection of grooves 14 forms a grid-shaped groove structure. In this example, each of the grooves 14 has a V-shaped cross section as schematically shown in FIG. 6.

A structure having recesses (or grooves) both on the upper surface 210a side and on the lower surface 210b side as illustrated in FIG. 6 may be obtained by injection molding, for example, by providing protruding portions that project toward the inside of the cavity at predetermined positions on the mold. With such a method, the recesses on the upper surface 210a side and the recesses on the lower surface 210b side can be formed at once, and it is possible to avoid the misalignment between the recesses on the upper surface 210a side and the recesses on the lower surface 210b side. Note that when light diffusion structures are provided on the upper surface 210a in the form of recesses 12, the depth of the recesses 11 located on the lower surface 210b may be determined appropriately as long as they do not reach the bottom surface 12b of the recesses 12. For example, the depth of the recesses 11 is in the range of 0.05 mm or more and 4 mm or less, preferably 0.1 mm or more and 1 mm or less.

Figure 7:
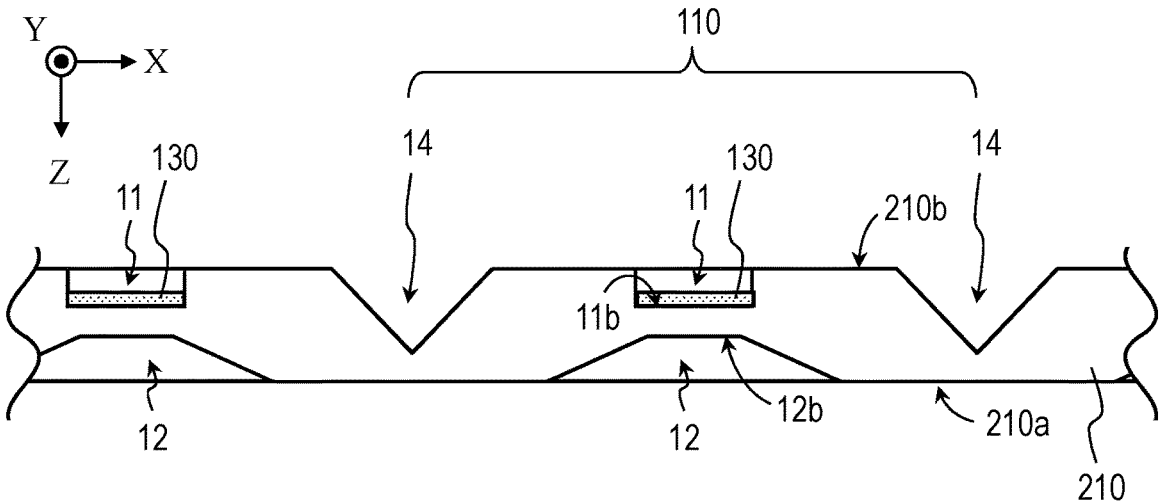
FIG. 7 is a schematic cross-sectional view illustrating an exemplary method for manufacturing the light emitting device according to the first embodiment of the present disclosure.

Next, the light-reflective resin layers 130 are formed on the bottom portions of the recesses 11. For example, a resin material including a light-reflective filler dispersed therein may be arranged in the recesses 11 using a dispenser, or the like, and then the resin material in the recesses 11 may be allowed to cure, thereby forming the light-reflective resin layers 130 in the recesses 11, as schematically shown in FIG. 7. Alternatively, a plate-shaped resin sheet may be formed from a resin material including a light-reflective filler dispersed therein, and resin pieces having a shape corresponding to the shape of the recess 11 as seen from above (e.g., a square shape) may be obtained from the resin sheet by cutting, punching, etc. Such resin pieces may be arranged on the bottom portions of the recesses 11. The resin sheet may be obtained by injection molding, compression molding, transfer molding, etc.

Figure 8:
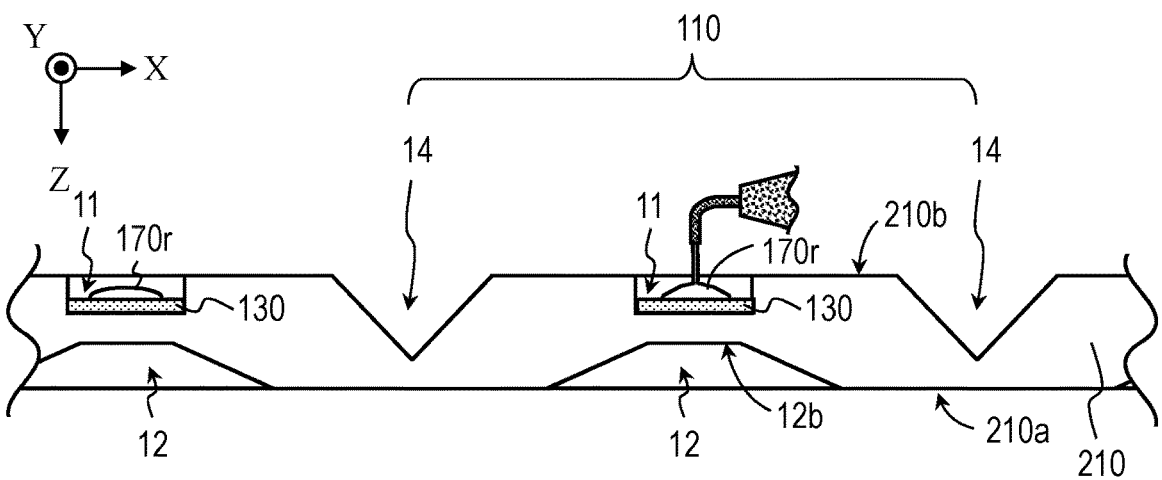
FIG. 8 is a schematic cross-sectional view illustrating an exemplary method for manufacturing the light emitting device according to the first embodiment of the present disclosure.
Figure 9:
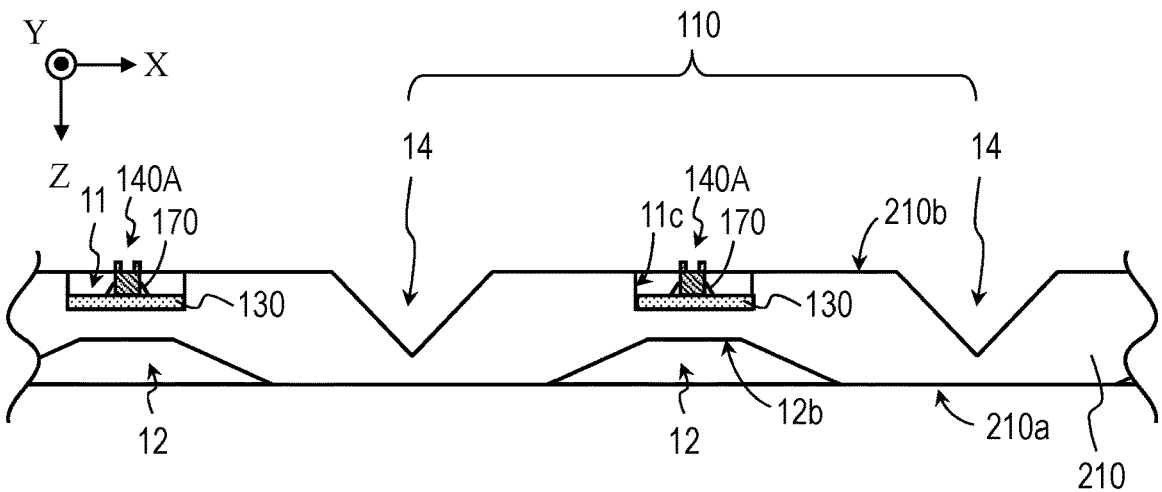
FIG. 9 is a schematic cross-sectional view illustrating an exemplary method for manufacturing the light emitting device according to the first embodiment of the present disclosure.

Next, the light emitting element 140A is attached to the light-reflective resin layer 130 arranged in each recess 11. Herein, first, as schematically shown in FIG. 8, a resin composition 170r to be the material of the bonding member 170 is applied onto the light-reflective resin layer 130 using a dispenser, or the like. The light emitting element 140A is arranged on the dispensed resin composition 170r. At this point, the light emitting element 140A is arranged on the resin composition 170r so that the upper surface 140a of the light emitting element 140A opposes the light-reflective resin layer 130. The resin composition 170r is allowed to cure, thereby forming the bonding member 170 from the resin composition 170r, and securing the light emitting element 140A on the light-reflective resin layer 130 by means of the bonding member 170, as schematically shown in FIG. 9. The light emitting element 140B having the reflective film 148, instead of the light emitting element 140A, may be secured on the light-reflective resin layer 130.

In the step of dispensing the resin composition 170r onto the light-reflective resin layer 130, it is beneficial that the resin composition 170r does not reach the outer edge of the light-reflective resin layer 130 as seen from above by adjusting the viscosity, the amount, etc., of the resin composition 170r. When the bonding member has a shape such that it reaches a lateral surface 11c defining the recess 11, there may be light that directly enters the lightguide plate 210 from the bonding member. Such light may possibly lead to an unevenness in luminance and an unevenness in emission color on the light emitting surface. When the size of the bonding member 170 as seen from above is made smaller than the size of the light-reflective resin layer 130, it is possible to avoid the generation of light that directly enters the lightguide plate 210 from the bonding member, thereby suppressing the unevenness in luminance and/or the unevenness in emission color.

With the configuration in which the light emitting element 140A is arranged on each of the light-reflective resin layers 130 as illustrated in FIG. 9, the light emitting element may be arranged at a predetermined position on the lower surface 210b side of the lightguide plate 210 with respect to the position of the light-reflective resin layer 130 directly under the recess 12 as the light diffusion structure. In other words, the light-reflective resin layer 130 may be used for the positioning of the light emitting element. Particularly, since the recess 11 is provided at a position directly under the recess 12, it is easy to arrange the light emitting element in the recess 11 so that the axis that is perpendicular to the bottom surface 12b of the recess 12 and passes through the center of the bottom surface 12b generally coincides with the optical axis of the light emitting element. By arranging a plurality of light emitting elements on the lightguide plate 210 so that the center of each light diffusion structure and the center of each light emitting element generally coincide with each other as seen from above, light from the light emitting element located in the recess 11 can be diffused more uniformly in the in-plane direction of the lightguide plate 210 by means of the recess 12 as the light diffusion structure, for example.

Figure 10:
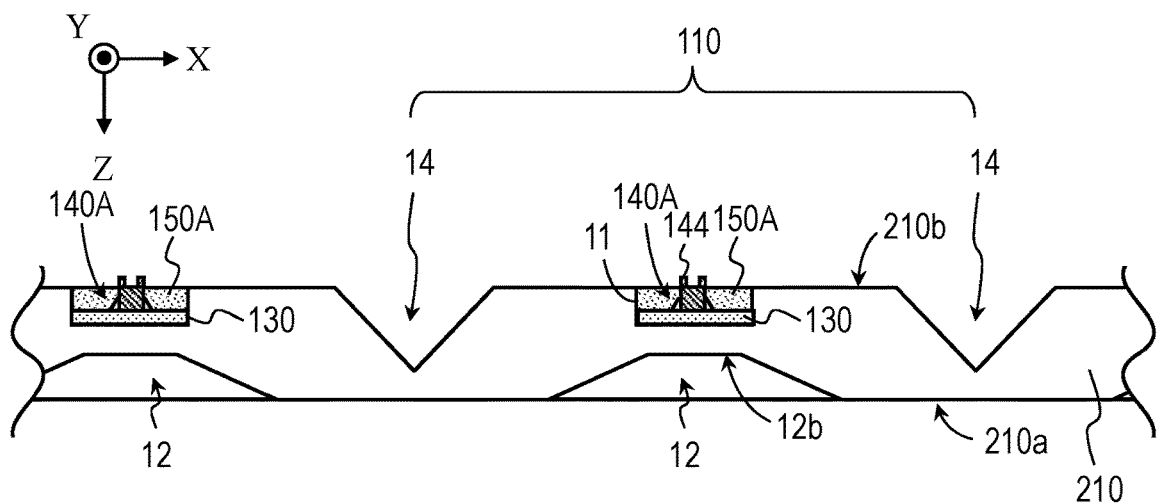
FIG. 10 is a schematic cross-sectional view illustrating an exemplary method for manufacturing the light emitting device according to the first embodiment of the present disclosure.

Next, the wavelength conversion member 150A is arranged in each recess 11. For example, by using a dispenser, or the like, the inside of each recess 11 is filled with a resin composition including particles of a phosphor, or the like, dispersed therein, and the resin composition is allowed to cure. Then, the wavelength conversion member 150A that covers at least a portion of the lateral surface 140c of the light emitting element 140A may be formed in each recess 11, as schematically shown in FIG. 10. At this point, the surface of the wavelength conversion member 150A may possibly be protruding from the lower surface 210b of the lightguide plate 210 or sunken from the lower surface 210b. Note however that the surface of the wavelength conversion member 150A does not need to be a flat surface that flushes with the lower surface 210b of the lightguide plate 210 as long as the electrode 144 of the light emitting element 140A is not completely covered by the wavelength conversion member 150A.

By providing a plurality of recesses 11 on the lower surface 210b of the lightguide plate 210 and forming the wavelength conversion member 150A in each recess 11, as in this example, it is possible to conserve the material of the wavelength conversion member as compared with a configuration where the wavelength conversion member is formed as a single layer for the plurality of light emitting elements 140A. Note that when the wavelength conversion member 150A has been formed, the electrode 144 of the light emitting element 140A is exposed from the wavelength conversion member 150A as schematically shown in FIG. 10.

Figure 11:
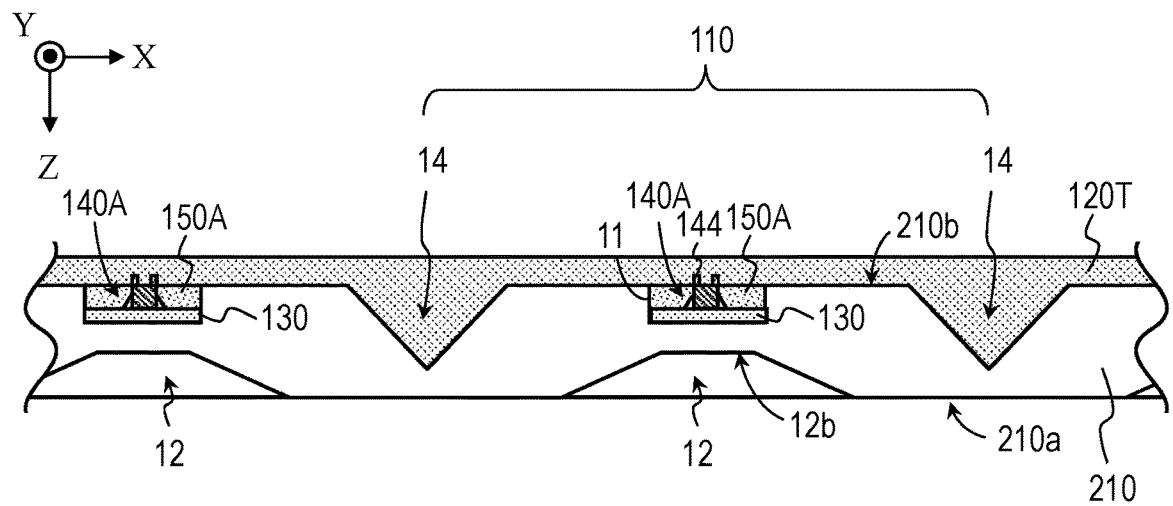
FIG. 11 is a schematic cross-sectional view illustrating an exemplary method for manufacturing the light emitting device according to the first embodiment of the present disclosure.

Next, as schematically shown in FIG. 11, a light-reflective resin layer 120T is formed on the lower surface 210b side of the lightguide plate 210 so as to cover the light emitting element 140A. For example, the material of the light-reflective resin layer 120T is applied onto the lower surface 210b of the lightguide plate 210 so as to cover the electrodes 144 of the light emitting elements 140A, and the material is then allowed to cure. The light-reflective resin layer 120T may be formed by using any of various methods such as transfer molding, compression molding, spraying, printing, potting, etc., for example. At this point, the grooves 14 may also be filled with the material of the light-reflective resin layer 120T. The material of the light-reflective resin layer 120T may be a resin material with a light-reflective filler dispersed therein as with the material of the light-reflective resin layer 130.

Figure 12:
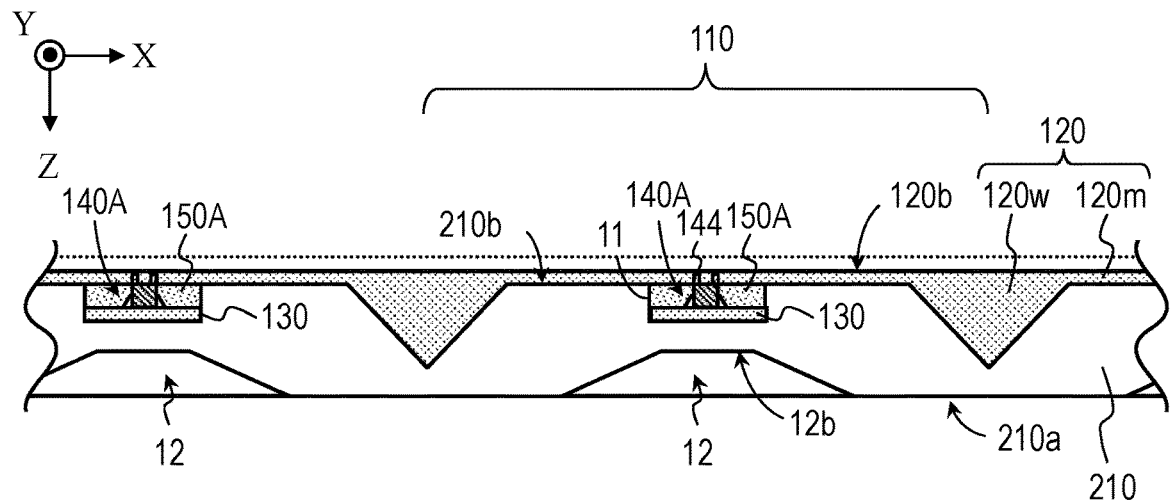
FIG. 12 is a schematic cross-sectional view illustrating an exemplary method for manufacturing the light emitting device according to the first embodiment of the present disclosure.

Then, a grinding process, or the like, is performed so that the lower surfaces of the electrodes 144 are exposed on the surface of the light-reflective resin layer 120T. Thus, the light-reflective members 120 may be formed from the light-reflective resin layer 120T as schematically shown in FIG. 12. As the area of the lower surface of the light emitting element 140A excluding the area where the electrode 144 is arranged is covered by the light-reflective member 120, it is possible to suppress light leakage to the lower surface 120b side of the light-reflective member 120 and improve the light extraction efficiency.

Figure 13:
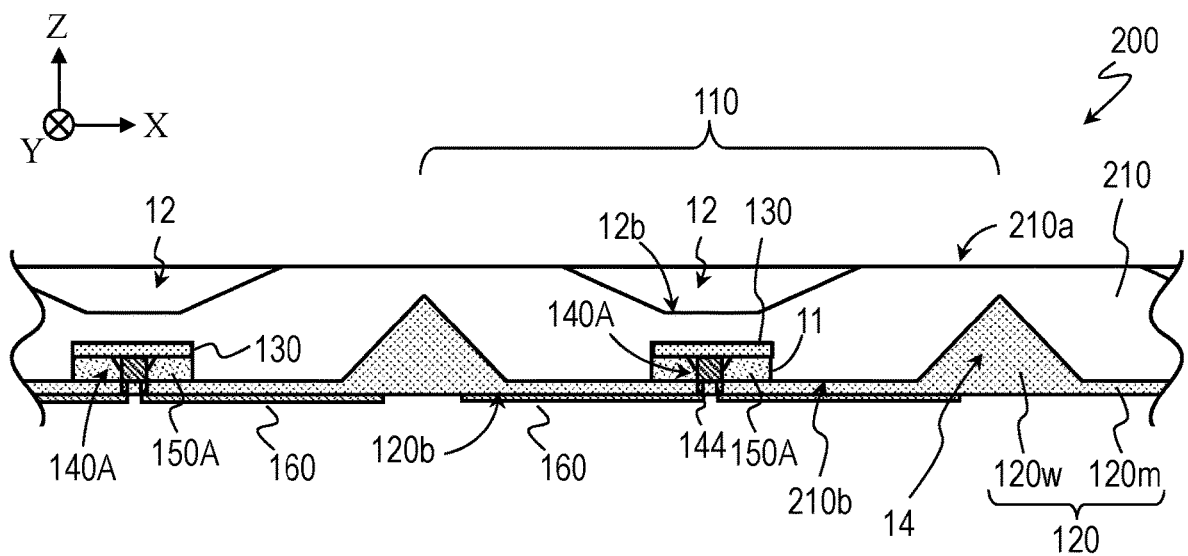
FIG. 13 is a schematic cross-sectional view illustrating an exemplary method for manufacturing the light emitting device according to the first embodiment of the present disclosure.

Thereafter, as necessary, the interconnect layer 160 is formed on the lower surface 120b of the light-reflective member 120 as schematically shown in FIG. 13. The interconnect layer 160 may be formed by, for example, forming the light-reflective member 120, and then forming a metal film on the lower surface 120b of the light-reflective member 120 by sputtering, or the like, and patterning the metal film by laser abrasion, for example. The metal film may be formed on the lower surface 120b of the light-reflective member 120 in the form of a layered film. For example, the metal film may be formed on the lower surface 120b of the light-reflective member 120 by successively depositing cu, Ni and Au.

Through the steps described above, the light emitting device 200 shown in FIG. 1 is obtained. Note that with the configuration illustrated in FIG. 13, the area of the upper surface 210a of the lightguide plate 210 excluding the recesses 12 and the area of the lower surface 210b thereof excluding the recesses 11 and the grooves 14 are generally flat surfaces. However, the shape of the upper surface 210a and the shape of the lower surface 210b of the lightguide plate 210 are not limited to this example, and a structure that diffuses or reflects light may be formed in the region excluding the recesses 12, the recesses 11 and the grooves 14. For example, minute irregularities may be provided in the area excluding the recesses 12, the recesses 11 and the grooves 14, or the area excluding the recesses 12, the recesses 11 and the grooves 14 may be formed as a rough surface.

As can be seen from the illustrative manufacturing steps described above, in the present embodiment, since the light emitting element 140A (or the light emitting element 140B) is secured in advance on the light emitting cell 100U side, not on the wiring board side, it is possible to suppress the misalignment between the light emitting element 140A and the light diffusion structure on the upper surface 110a side of the lightguide plate 110. Moreover, light that is diffused through the wavelength conversion member 150A and/or the lightguide plate 110 is emitted from the upper surface of the light emitting cell 100U, i.e., the upper surface 110a of the lightguide plate 110, and it is therefore possible to realize more uniform light.

Note that in the example described above with reference to FIG. 1, the light emitting cells 100U are arranged in four rows by four columns. Therefore, the wall portion 120w (see FIG. 2) of the light-reflective member 120 has a grid-shaped array surrounding each of the light emitting elements 140A that are arranged in four rows by four columns. Herein, the light emitting cells 100U of the light emitting device 200 typically have the same structure. However, it is not necessary in the embodiments of the present disclosure that the light emitting device be formed only of a plurality of light emitting cells having the same structure.

For example, the height of the wall portion 120w may be varied between four of the 16 light emitting cells 100U arranged in four rows by four columns that are located in the central portion of the light emitting surface, and the twelve light emitting cell in the peripheral portion surrounding the four light emitting cells. Particularly, for the twelve light emitting cells in the peripheral portion, the wall portions 120w located along the four sides of the rectangular shape that defines the light emitting surface may be made higher. By making the wall portions 120w located along the outermost periphery of the lightguide plate 210 higher, it is possible to improve the luminance at the locations along the four sides of the rectangular shape that defines the light emitting surface. That is, by varying the height of the wall portion 120w between the light emitting cells 100U, the difference between the luminance in the peripheral portion of the lightguide plate 210 and the luminance in the central portion thereof may possibly be reduced. Alternatively, the configuration of the light diffusion structure, e.g., the size of the recess 12, may be varied between one or more light emitting cells located in the central portion of the light emitting surface and light emitting cells located in the peripheral portion.

(Second Variation)

Figure 14:
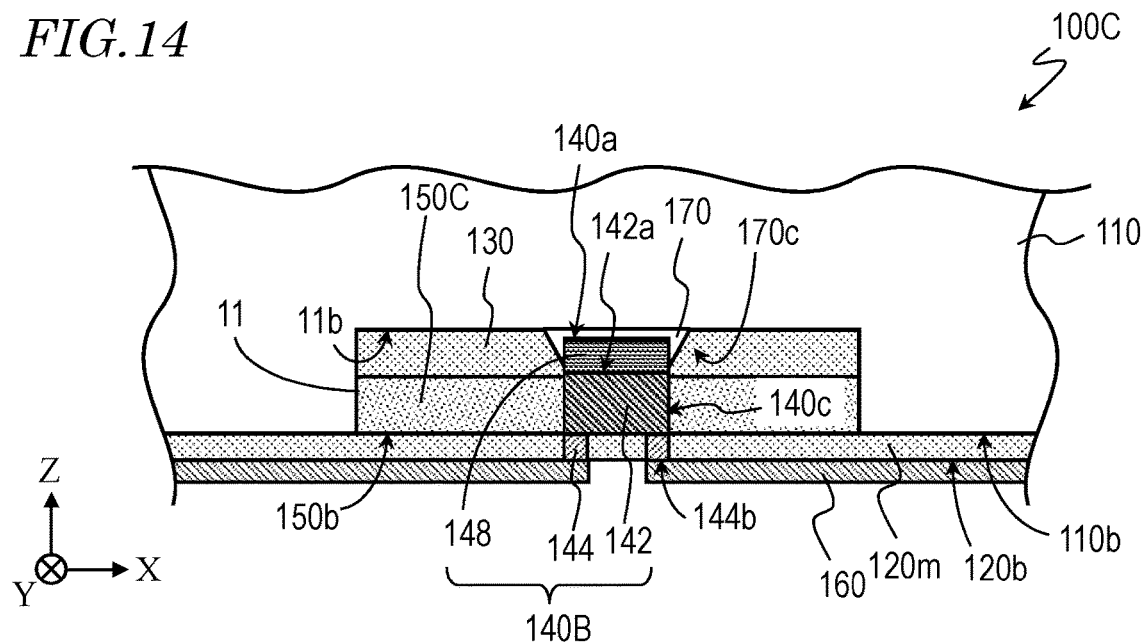
FIG. 14 is a schematic cross-sectional view showing another variation of the light emitting device according to the first embodiment of the present disclosure.

FIG. 14 is a schematic cross-sectional view showing another variation of the light emitting device according to the first embodiment of the present disclosure. As in FIG. 5, etc., FIG. 14 shows, on an enlarged scale, a portion of the light emitting cell including the light emitting element and the vicinity thereof.

Similar to the example shown in FIG. 5, a light emitting cell 100C shown in FIG. 14 includes the light emitting element 140B arranged in the recess 11 of the lightguide plate 110. As already described above with reference to FIG. 5, the light emitting element 140B includes the reflective film 148 located on the upper surface 140a side. The main difference between the light emitting cell 100C and the light emitting cell 100B described above with reference to FIG. 5 is that with the light emitting cell 100C shown in FIG. 14, the light-reflective resin layer 130 is formed in the area of the bottom surface 11b of the recess 11 excluding the area opposing the upper surface 140a of the light emitting element 140B.

In the example shown in FIG. 14, the reflective film 148 of the light emitting element 140B is attached to the bottom portion of the recess 11 by means of the bonding member 170 arranged around the center of the bottom surface 11b of the recess 11. That is, the light emitting element 140B is secured on the lightguide plate 110 without using the light-reflective resin layer 130 therebetween. Therefore, the light-reflective resin layer 130 is absent between the bottom surface 11b of the recess 11 and the upper surface 140a of the light emitting element 140B. In other words, in this example, the light-reflective resin layer 130 is formed on the bottom surface 11b of the recess 11 in an annular shape that surrounds the light emitting element 140B as seen from above. Note that the upper surface 140a of the light emitting element 140B may be in contact with the bottom surface 11b of the recess 11.

As compared with the light emitting cell 100B shown in FIG. 5, the light emitting cell 100C includes a wavelength conversion member 150C, instead of the wavelength conversion member 150A. It is similar to the example described above with reference to FIG. 5 in that the wavelength conversion member 150C covers the lateral surface 140c of the light emitting element 140B in the recess 11. Since the light-reflective resin layer 130 is formed on the area of the bottom surface 11b of the recess 11 excluding the area where the reflective film 148 is attached, light that has been emitted from the lateral surface 140c of the light emitting element 140B to enter the wavelength conversion member 150C maybe introduced into the lightguide plate 110 after being diffused in the in-plane direction of the lightguide plate 110. That is, similar to the examples described above, light whose wavelength has been converted through the wavelength conversion member 150C and light that has passed as it is through the wavelength conversion member 150C may be effectively diffused in the in-plane direction of the lightguide plate 110.

In this example, the light-reflective resin layer 130 is absent directly above the light emitting element 140B. However, since the light emitting element 140B has the reflective film 148, it is possible to prevent the area that is directly above the light emitting element 140B from appearing locally significantly bluish as the light emitting device 200 is seen from the upper surface 110a side of the lightguide plate 110. In view of reducing the blueness in the area directly above the light emitting element 140B, it is preferred that the ratio of the area of the interface between the bonding member 170 and the lightguide plate 110 with respect to the area of the reflective film 148 as seen from above is close to 1. Alternatively, a white powder (e.g., particles of titanium dioxide), etc., which is a light-reflecting additive, may be contained in the bonding member 170. With the configuration illustrated in FIG. 14, because the light-reflective resin layer 130 is absent directly above the light emitting element 140B, it is possible to reduce the distance from the lower surface 210b to the upper surface 210a of the lightguide plate 210 and to provide an even thinner light emitting device.

(Exemplary Method for Manufacturing Light Emitting Device Having Light Emitting Cell 100C)

Now, an exemplary method for manufacturing the light emitting device including the light emitting cell 100C shown in FIG. 14 will be briefly described. First, the lightguide plate 210 is provided. The lightguide plate 210 may be provided as described in the example described above with reference to FIG. 6. In this example, the recesses 11 of the lightguide plate 210 may have a smaller depth as compared with the example shown in FIG. 6.

Figure 15:
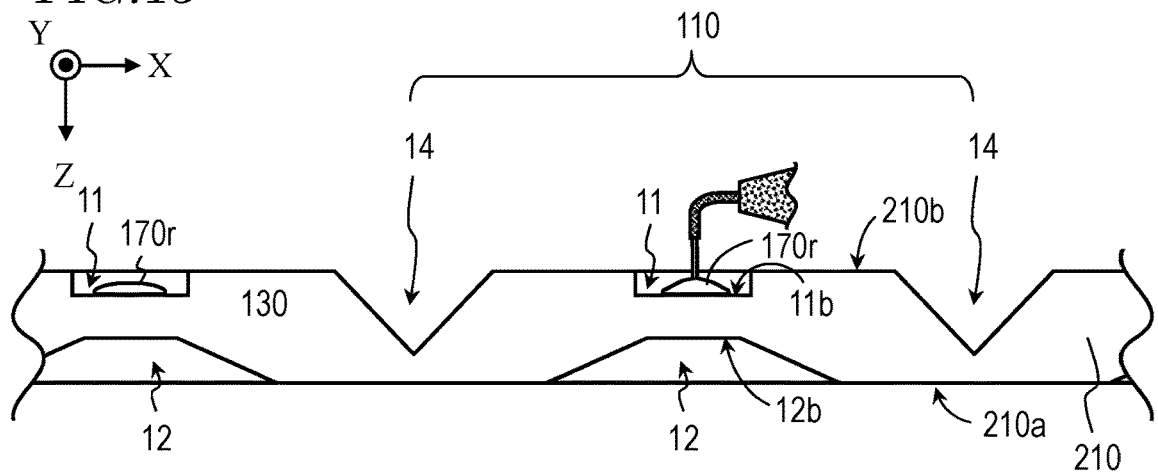
FIG. 15 is a schematic cross-sectional view illustrating another exemplary method for manufacturing the light emitting device according to the first embodiment of the present disclosure.
Figure 16:
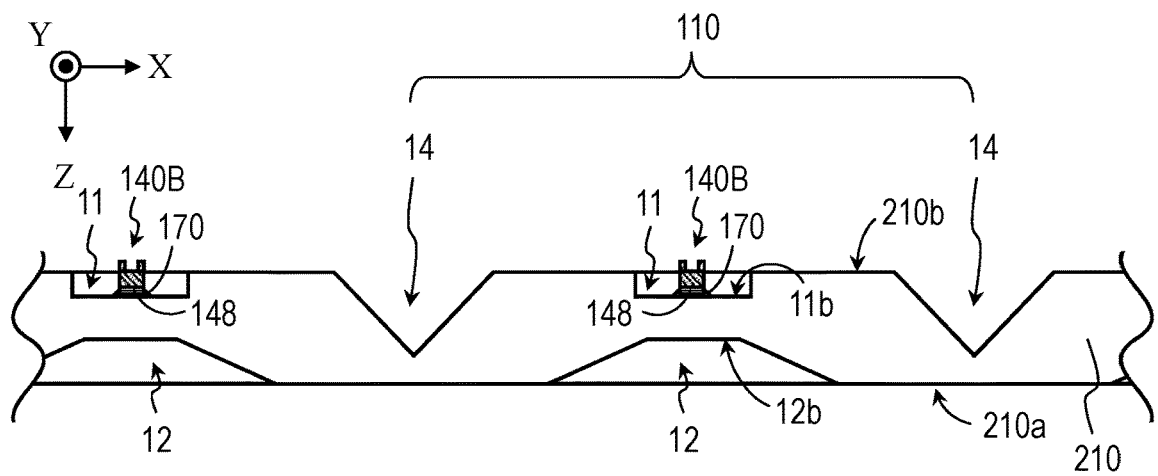
FIG. 16 is a schematic cross-sectional view illustrating another exemplary method for manufacturing the light emitting device according to the first embodiment of the present disclosure.

Next, as schematically shown in FIG. 15, the resin composition 170r is applied onto the bottom surface 11b of each recess 11. Thereafter, as schematically shown in FIG. 16, the light emitting element 140B is arranged on the resin composition 170r. In this process, the light emitting element 140B is arranged in each recess 11 so that the upper surface 140a of the light emitting element 140B, in other words, the side of the reflective film 148, faces the bottom surface 11b of the recess 11. Then, the resin composition 170r is allowed to cure to form the bonding member 170, and the light emitting element 140B may be secured on the bottom portion of each recess 11 by the bonding member 170.

Figure 17:
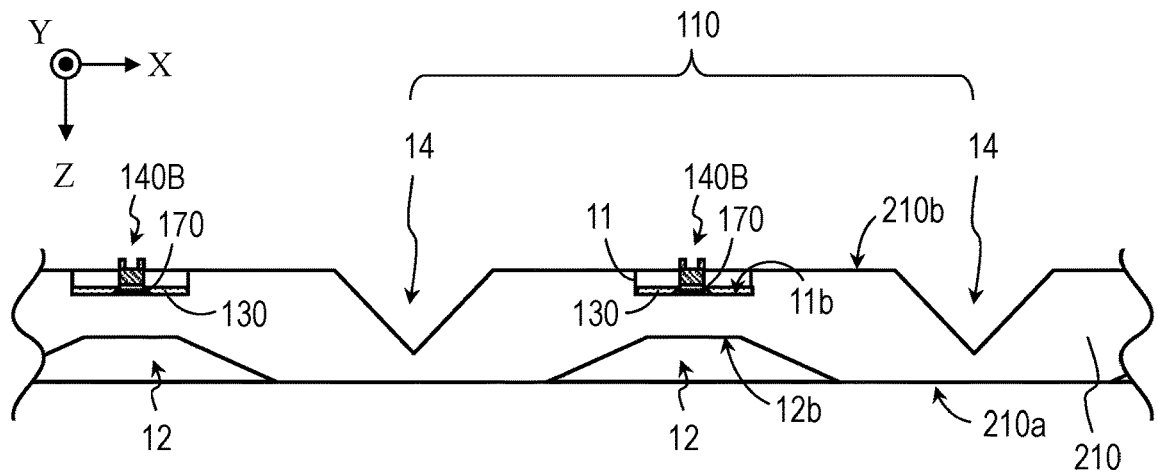
FIG. 17 is a schematic cross-sectional view illustrating another exemplary method for manufacturing the light emitting device according to the first embodiment of the present disclosure.

Next, a resin material including a light-reflective filler dispersed therein is applied onto the bottom surface 11b of each recess 11 by using a dispenser, or the like. The dispensed resin material is allowed to cure, thereby forming the light-reflective resin layer 130 on the area of the bottom surface 11b of the recess 11 excluding the area where the reflective film 148 of the light emitting element 140B is attached, as schematically shown in FIG. 17. In this process, the thickness of the light-reflective resin layer 130 may be adjusted based on the amount of the resin material to be applied onto the bottom surface 11b of each recess 11. The thickness of the light-reflective resin layer 130 may be determined appropriately depending on the target optical characteristics, and it is needless to say that the thickness is not limited to that shown in FIG. 14, etc.

Figure 18:
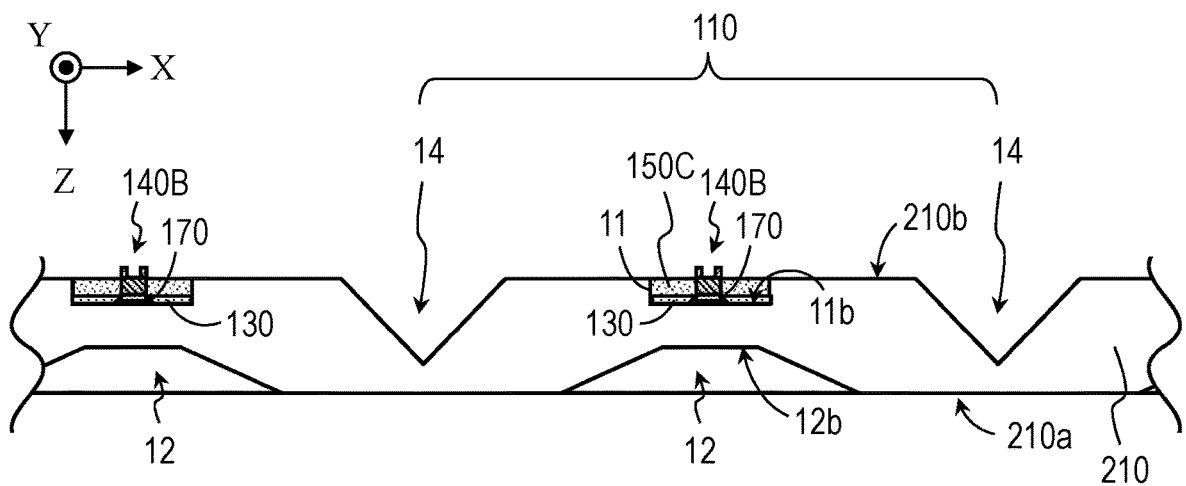
FIG. 18 is a schematic cross-sectional view illustrating another exemplary method for manufacturing the light emitting device according to the first embodiment of the present disclosure.
Figure 19:
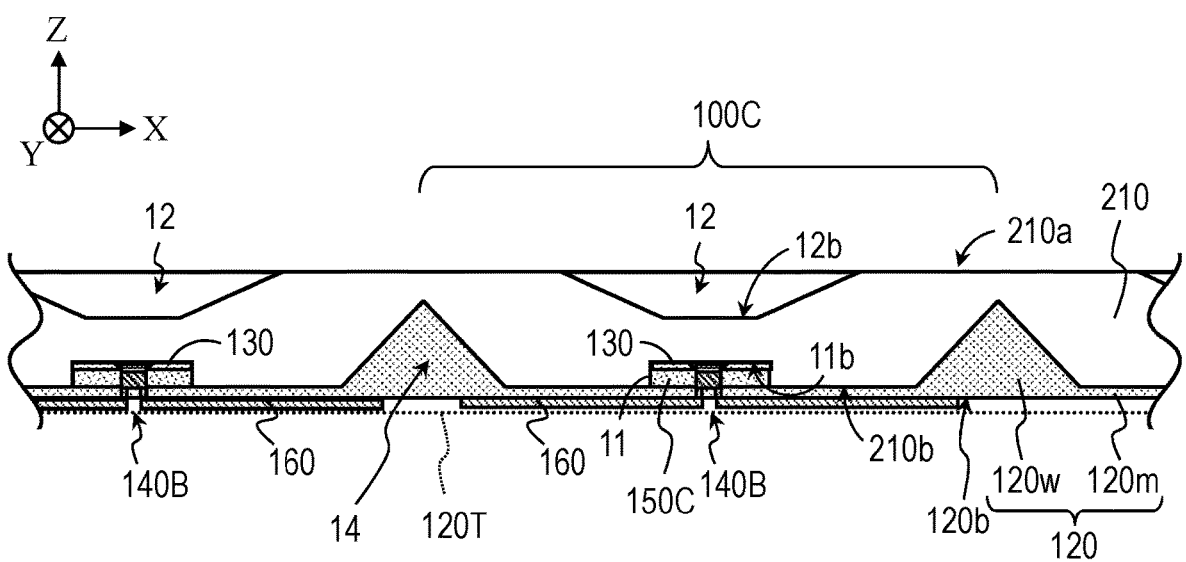
FIG. 19 is a schematic cross-sectional view illustrating another exemplary method for manufacturing the light emitting device according to the first embodiment of the present disclosure.

Next, the inside of each recess 11 is filled with the material of the wavelength conversion member 150C, and the material is allowed to cure. Thus, it is possible to form the wavelength conversion member 150C in each recess 11 that covers at least a portion of the lateral surface 140c of the light emitting element 140B as schematically shown in FIG. 18.

The subsequent steps may be similar to the manufacturing steps described above. That is, the light-reflective resin layer 120T is formed on the lower surface 210b side of the lightguide plate 210 and is machined by grinding, etc., so that the lower surfaces of the electrodes 144 are exposed on the surface of the light-reflective resin layer 120T. Thus, it is possible to form the light-reflective member 120 from the light-reflective resin layer 120T. As necessary, the interconnect layer 160 is formed on the lower surface 120b of the light-reflective member 120 as schematically shown in FIG.

19. Through the steps described above, there is obtained a light emitting device including a plurality of light emitting cells 100C.

Second Embodiment

Figure 20:
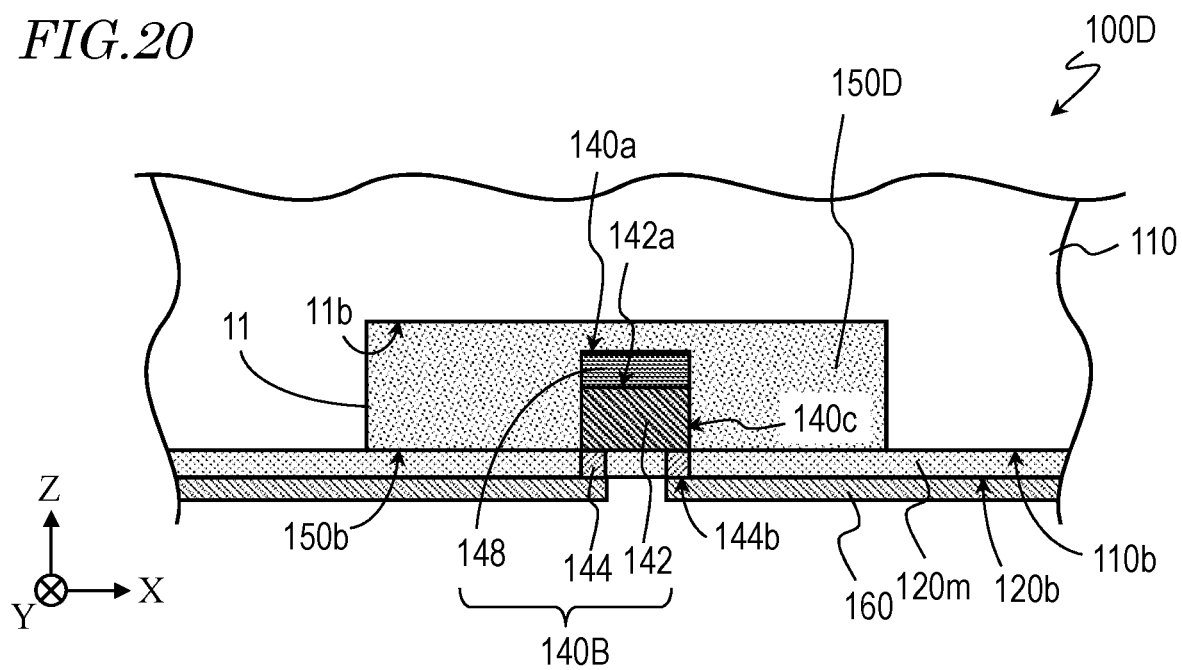
FIG. 20 is a schematic cross-sectional view showing an exemplary configuration of a light emitting device according to a second embodiment of the present disclosure.

FIG. 20 shows an exemplary configuration of a light emitting device according to a second embodiment of the present disclosure. As in FIG. 5, FIG. 14, etc., FIG. 20 shows, on an enlarged scale, a portion of the light emitting cell including the light emitting element and the vicinity thereof.

As compared with the light emitting cell 100B described above with reference to FIG. 5, a light emitting cell 100D shown in FIG. 20 includes a wavelength conversion member 150D, instead of the wavelength conversion member 150A. As in the examples described above with reference to FIG. 5 and FIG. 14, the wavelength conversion member 150D covers the lateral surface 140c of the light emitting element 140B in the recess 11. In this example, a portion of the wavelength conversion member 150D is located between the reflective film 148 arranged on the upper surface 140a side of the light emitting element 140B and the bottom surface 11b of the recess 11, as schematically shown in FIG. 20. That is, in this example, the wavelength conversion member 150D also covers the upper surface 140a of the light emitting element 140B.

As in this example, a portion of the wavelength conversion member 150D may be interposed between the reflective film 148 of the light emitting element 140B and the lightguide plate 110. Also with such a configuration, as with the first embodiment, there is provided a surface light source that basically does not require a wiring board. Note that as compared with the light emitting cell 100B shown in FIG. 5, the light emitting cell 100D does not include the light-reflective resin layer 130. However, in the illustrated example, the light emitting element 140B includes the reflective film 148 on the upper surface 140a side and is arranged in the recess 11 so that the upper surface 140a thereof faces the bottom portion of a corresponding one of the recesses 11. Therefore, light that is emitted from the upper surface 142a of the main body 142 toward directly above the light emitting element 140B is reduced by the reflective film 148, thereby preventing the luminance in the area directly above the light emitting element 140B from becoming significantly high as the lightguide plate 110 is seen from the upper surface 110a side. That is, as in the first embodiment, it is possible to provide a thin surface light source with which unevenness in luminance is suppressed.

(Third Variation)

Figure 21:
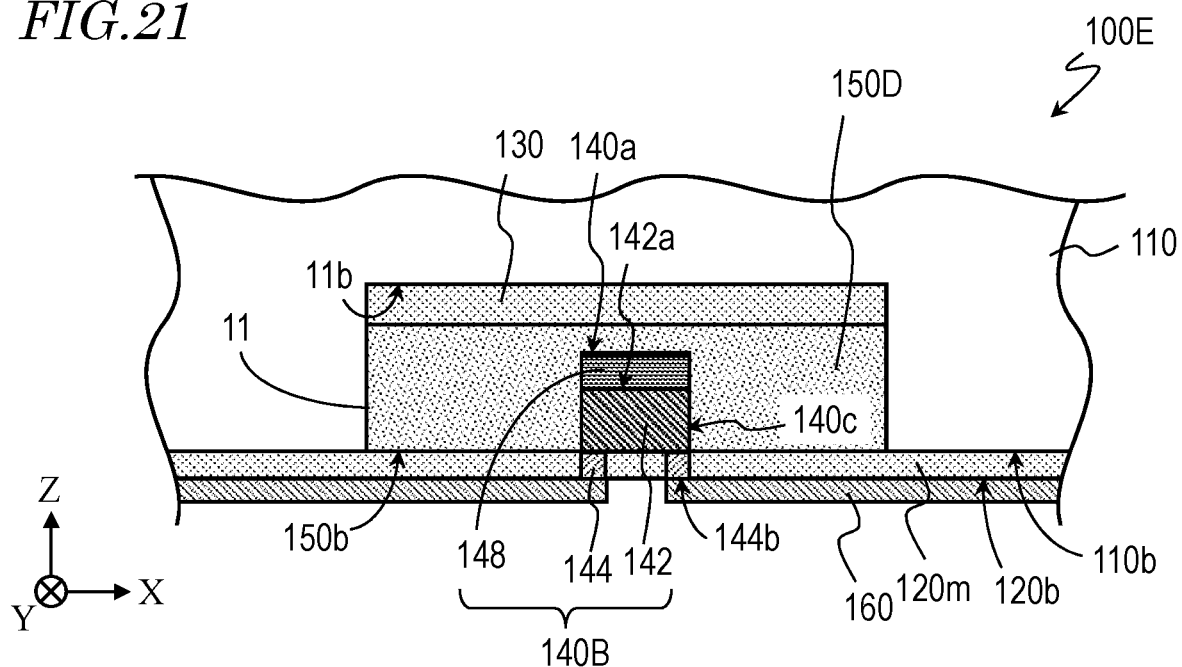
FIG. 21 is a schematic cross-sectional view showing a variation of the light emitting device according to the second embodiment of the present disclosure.

FIG. 21 schematically shows a variation of the light emitting device according to the second embodiment of the present disclosure. As compared with the light emitting cell 100D shown in FIG. 20, a light emitting cell 100E shown in FIG. 21 further includes the light-reflective resin layer 130 that is located between the bottom portion of the recess 11 and the wavelength conversion member 150D. By further arranging, in the recess 11, the light-reflective resin layer 130 at least a portion of which is located between the bottom surface 11b of the recess 11 and the wavelength conversion member 150D as in this example, light traveling through the recess 11 toward the upper surface 110a of the lightguide plate 110 can be reflected at the position of the light-reflective resin layer 130. Therefore, light whose wavelength has been converted through the wavelength conversion member 150D can be efficiently diffused in the in-plane direction of the lightguide plate 110.

(Exemplary Method for Manufacturing Light Emitting Device Having Light Emitting Cell 100D or Light Emitting Cell 100E)

Now, an exemplary method for manufacturing the light emitting device including the light emitting cell 100D shown in FIG. 20 or the light emitting cell 100E shown in FIG. 21 will be briefly described.

Figure 22:
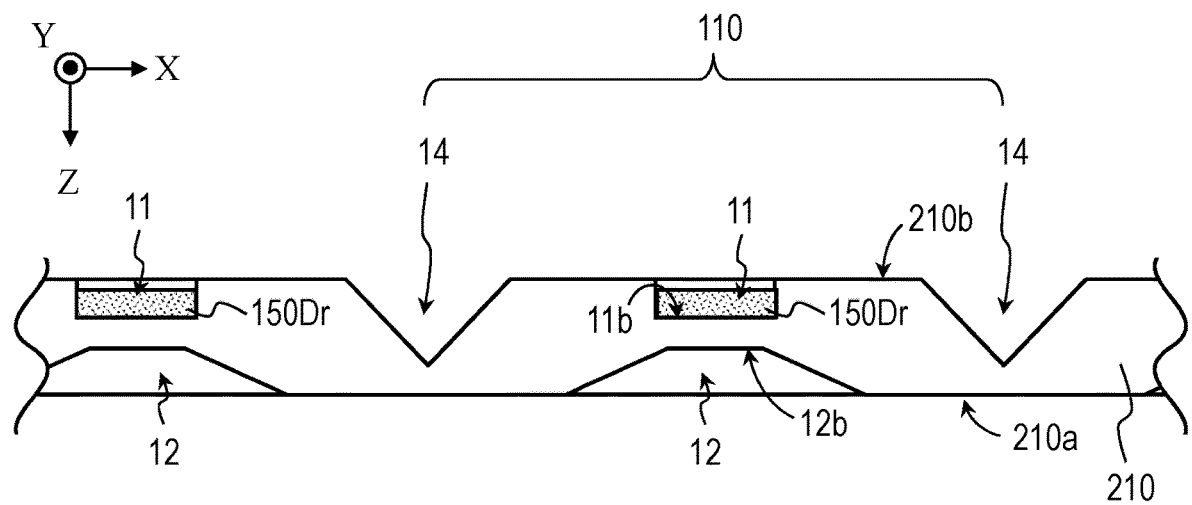
FIG. 22 is a schematic cross-sectional view illustrating an exemplary method for manufacturing the light emitting device according to the second embodiment of the present disclosure.

First, the lightguide plate 210 is provided as described in the examples that have been described above. Next, as shown in FIG. 22, a resin composition 150Dr, which is the material of the wavelength conversion member 150D, is applied onto the bottom surface 11b of each recess 11 by using a dispenser, or the like. In this process, instead of filling the entirety of each recess 11, the amount of the resin composition 150Dr is adjusted so that the volume of the resin composition 150Dr to be introduced into the recess 11 is generally equal to the volume that is obtained by subtracting the volume of a portion of the light emitting element 140B excluding the electrode 144 from the volume of the recess 11.

Figure 23:
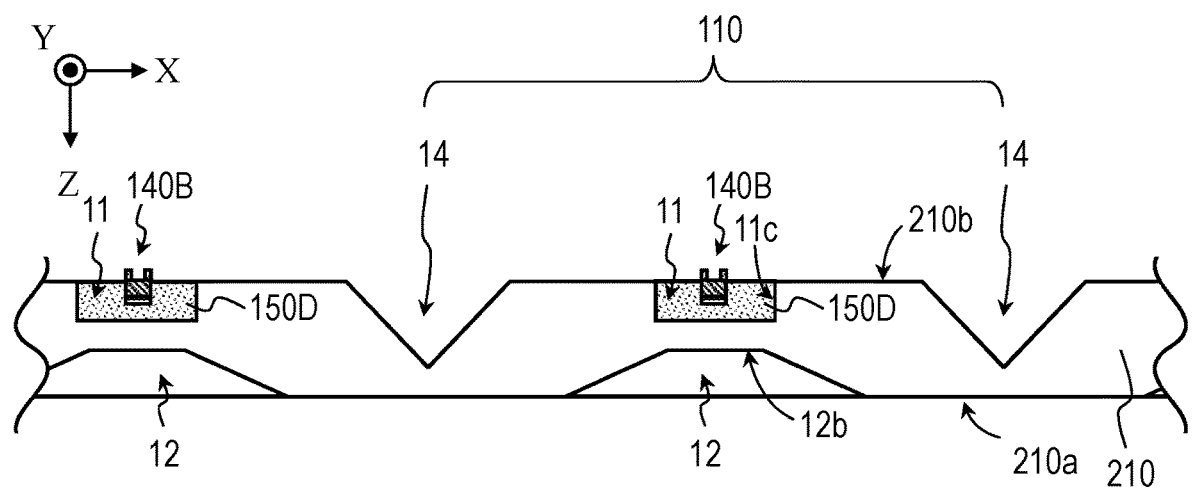
FIG. 23 is a schematic cross-sectional view illustrating an exemplary method for manufacturing the light emitting device according to the second embodiment of the present disclosure.

Next, the light emitting element 140B is arranged in the recess 11. In this process, the space between the lateral surface 11c of the recess 11 and the lateral surface 140c of the light emitting element 140B is filled with an uncured resin composition 150Dr by pushing the light emitting element 140B into the resin composition 150Dr. The resin composition 150Dr is allowed to cure in such a state, and it is possible to form the wavelength conversion member 150D, in each recess 11, that covers the lateral surface 140c and the upper surface 140a of the light emitting element 140B, as schematically shown in FIG. 23.

Figure 24:
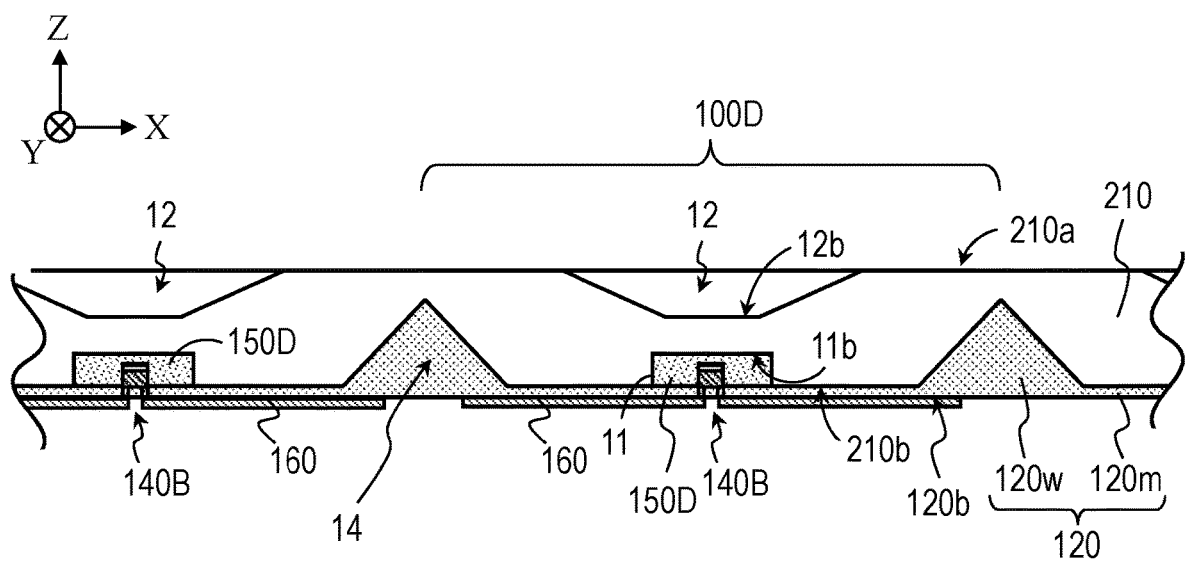
FIG. 24 is a schematic cross-sectional view illustrating an exemplary method for manufacturing the light emitting device according to the second embodiment of the present disclosure.

The subsequent steps may be similar to those of the first embodiment. For example, after the light-reflective resin layer 120T is formed on the lower surface 210b side of the lightguide plate 210, the lower surfaces of the electrodes 144 are exposed on the surface of the light-reflective resin layer 120T, thereby forming the light-reflective member 120. Further, as necessary, the interconnect layer 160 may be formed on the lower surface 120b of the light-reflective member 120, as schematically shown in FIG. 24. Through the steps described above, there is obtained a light emitting device of which a unit component is the light emitting cell 100D shown in FIG. 20.

Figure 25:
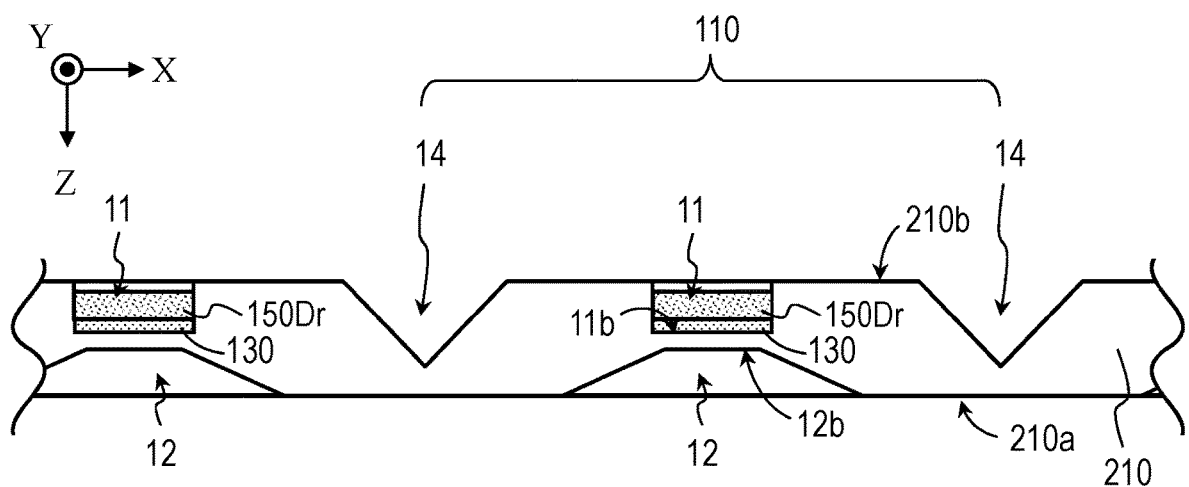
FIG. 25 is a schematic cross-sectional view illustrating another exemplary method for manufacturing the light emitting device according to the second embodiment of the present disclosure.

A light emitting device of which a unit component is the light emitting cell 100E shown in FIG. 21 may be obtained as follows. After the lightguide plate 210 is provided and before the wavelength conversion member 150D is formed, a resin material including a light-reflective filler dispersed therein is arranged in each recess 11, and the resin material in each recess 11 is allowed to cure, thereby forming the light-reflective resin layer 130, as in the example described above with reference to FIG. 7. Next, as shown in FIG. 25, an uncured resin composition 150Dr is applied onto the light-reflective resin layer 130.

The subsequent steps may be similar to those of the example described above with reference to FIG. 23 and FIG. 24. That is, the light emitting element 140B is arranged in the recess 11 where the resin composition 150Dr has been applied. By immersing the light emitting element 140B into the resin composition 150Dr, the space between the lateral surface 11c of the recess 11 and the lateral surface 140c of the light emitting element 140B may be filled with the resin composition 150Dr, as in the example described above with reference to FIG. 23. In the step of applying the resin composition 150Dr onto each recess 11, the position of the surface of the resin composition 150Dr with the light emitting element 140B immersed into the resin composition 150Dr may be made to generally coincide with the position of the lower surface 210b of the lightguide plate 210 by adjusting the amount of the resin composition 150Dr to be in the recess 11.

Figure 26:
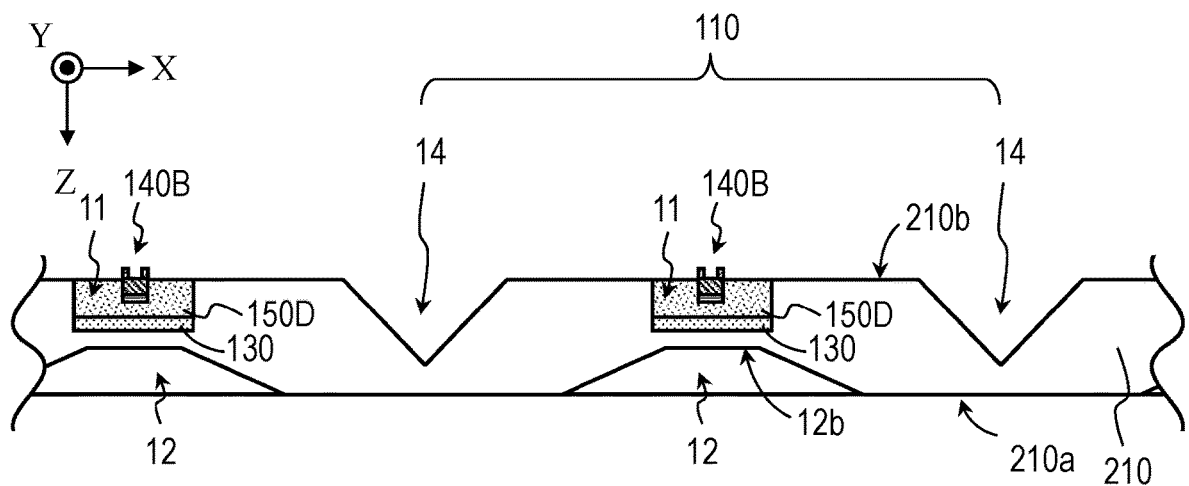
FIG. 26 is a schematic cross-sectional view illustrating another exemplary method for manufacturing the light emitting device according to the second embodiment of the present disclosure.

Then, the resin composition 150Dr is allowed to cure. As the resin composition 150Dr cures, the wavelength conversion member 150D that covers the lateral surface 140c and the upper surface 140a of the light emitting element 140B can be formed, from the resin composition 150Dr, in each recess 11, as shown in FIG. 26.

Figure 27:
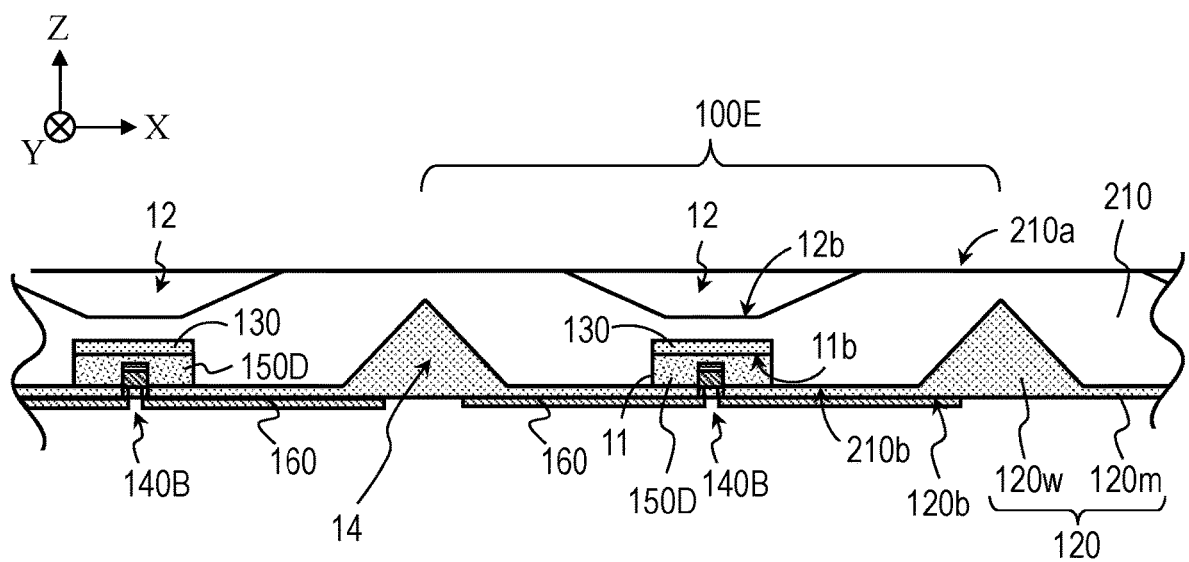
FIG. 27 is a schematic cross-sectional view illustrating another exemplary method for manufacturing the light emitting device according to the second embodiment of the present disclosure.

Then, for example, the light-reflective member 120 is formed on the lower surface 210b side of the lightguide plate 210, and the interconnect layer 160 is formed on the lower surface 120b of the light-reflective member 120 as necessary. Through the steps described above, there is obtained a light emitting device of which a unit component is the light emitting cell 100E as shown in FIG. 27.

(Another Method for Manufacturing Wavelength Conversion Member 150D)

Figure 28:
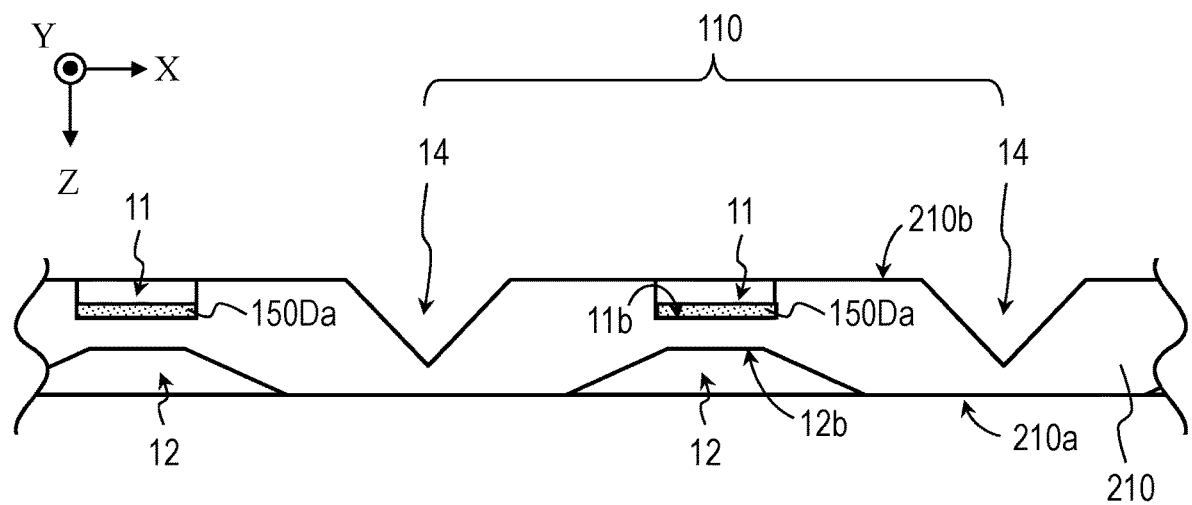
FIG. 28 is a schematic cross-sectional view illustrating another exemplary method for manufacturing wavelength conversion members of the light emitting device according to the second embodiment of the present disclosure.

Alternatively, the wavelength conversion member 150D may be formed as described below. First, the lightguide plate 210 is provided as described in the examples that have been described above. Next, an uncured resin composition 150Dr is applied onto the bottom surface 11b of each recess 11 by using a dispenser, or the like. Then, preliminary curing of the resin composition 150Dr may be done by using heat, or the like. Thus, a first wavelength conversion layer 150Da is formed on the bottom portion of the recess 11 as schematically shown in FIG. 28.

Figure 29:
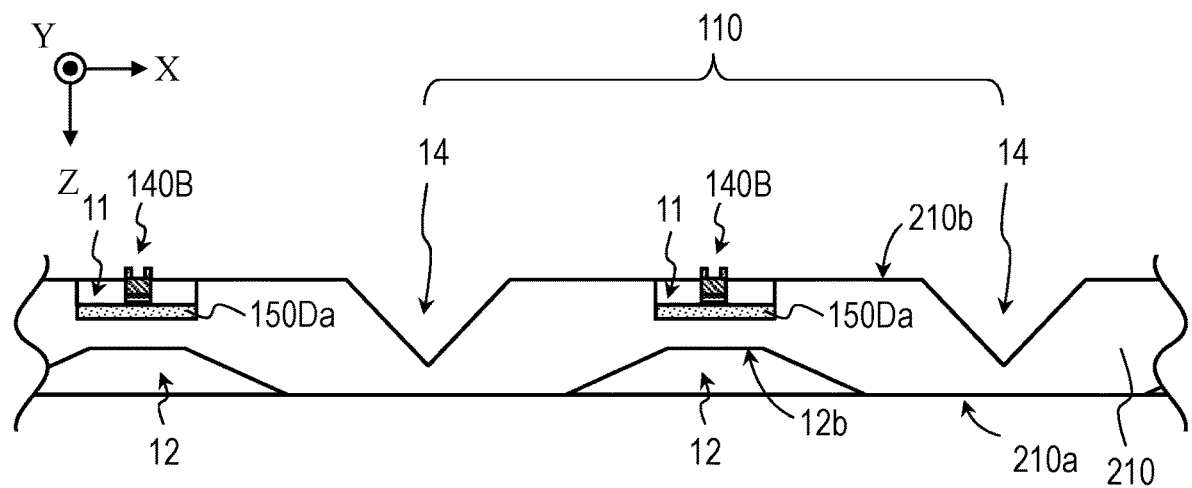
FIG. 29 is a schematic cross-sectional view illustrating another exemplary method for manufacturing wavelength conversion members of the light emitting device according to the second embodiment of the present disclosure.

Next, as shown in FIG. 29, the light emitting element 140B is arranged on the first wavelength conversion layer 150Da, which has been subjected to preliminary curing. Then, the inside of each recess 11 is filled further with an uncured resin composition 150Dr. The first wavelength conversion layer 150Da is allowed to cure, together with the added resin composition 150Dr. Thus, in each recess 11, the wavelength conversion member 150D that covers the lateral surface 140c and the upper surface 140a of the light emitting element 140B can be formed from the first wavelength conversion layer 150Da and the uncured resin composition 150Dr. That is, it is possible to obtain a structure similar to the configuration shown in FIG. 20. Note that by preforming the light-reflective resin layer 130 on the bottom surface 11b of each recess 11 before the formation of the first wavelength conversion layer 150Da, as in the example described above with reference to FIG. 25, it is possible to obtain a structure similar to the light emitting cell 100E shown in FIG. 21.

Third Embodiment

Figure 30:
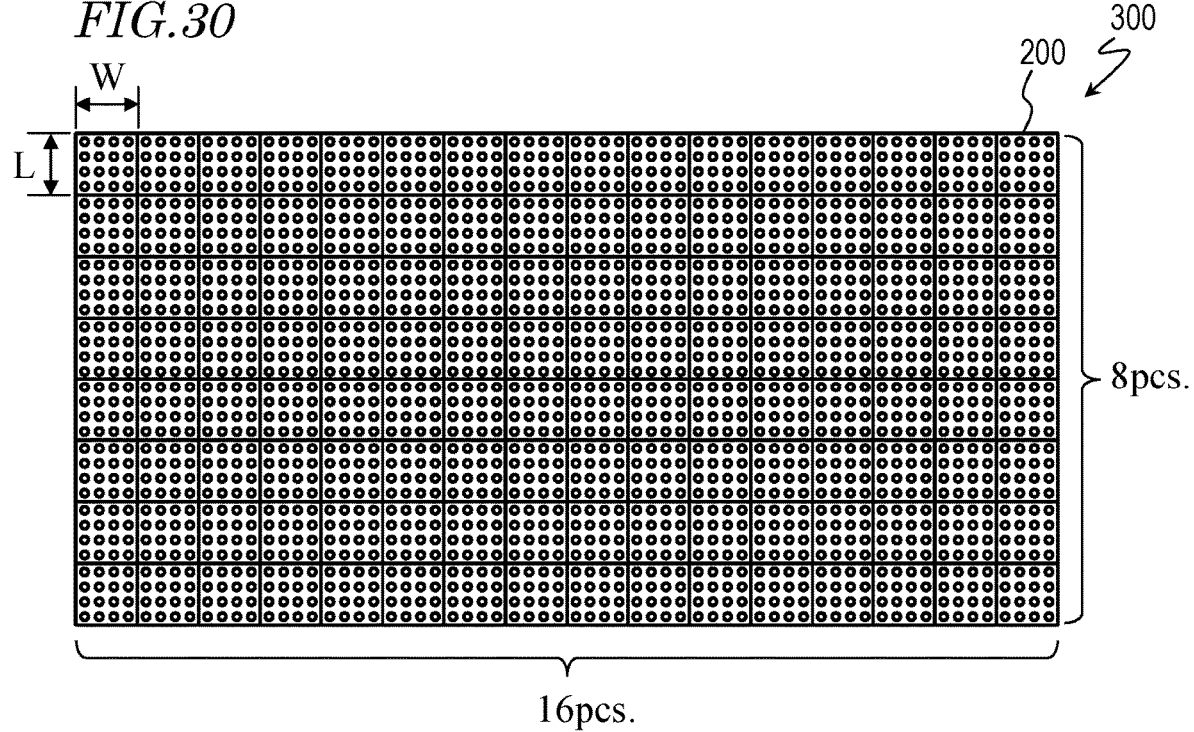
FIG. 30 is a schematic plan view showing an example of a light emitting module according to a third embodiment of the present disclosure.

FIG. 30 shows an example of a light emitting module according to a third embodiment of the present disclosure. A light emitting module 300 shown in FIG. 30 includes a two-dimensional array of light emitting devices 200. FIG. 30 is an example in which the light emitting devices 200 described above are arranged in 8 rows by 16 columns, schematically showing the appearance of the two-dimensional array of light emitting devices 200 as seen from the upper surface 210a side of the lightguide plate 210.

In the row direction or the column direction, the lightguide plates 210 of two adjacent light emitting devices 200 are typically in direct contact with each other. However, it is not necessary that the two-dimensional array be formed so that the lightguide plates 210 of two adjacent light emitting devices 200 are in direct contact with each other, but a lightguide structure may be interposed between two lightguide plates 210 adjacent to each other, wherein the lightguide structure optically couples together the lightguide plates. For example, such a lightguide structure can be formed by applying a light-transmitting adhesive onto the lateral surface of the lightguide plate 210, and then allowing the applied adhesive to cure. Alternatively, a lightguide structure may be formed by two-dimensionally arranging a plurality of light emitting devices 200 with an interval therebetween, filling the area between two lightguide plates 210 adjacent to each other with a light-transmitting resin material, and then allowing the resin material to cure. The material of the lightguide structure located between lightguide plates 210 may be similar to the bonding member 170 described above. It is advantageous that a material having a refractive index that is generally equal to or greater than that of the material of the lightguide plates 210 is used as the base material of the lightguide structure. The lightguide structure located between lightguide plates 210 may be given the light diffusion function.

In the example shown in FIG. 30, the vertical length L and the horizontal length W of each light emitting device 200 are about 24.3 mm and about 21.5 mm, respectively, for example. Therefore, the array of light emitting devices 200 shown in FIG. 30 is suitable for a 15.6-inch screen size with an aspect ratio of 16:9. For example, the array of light emitting devices 200 shown in FIG. 30 may suitably be used for the backlight unit of a laptop computer having a 15.6-inch screen size. Note that with the configuration where a plurality of light emitting devices 200 are combined together, the luminance may possibly be slightly lower directly above the boundary between light emitting devices 200 as compared with the luminance in the area of the lightguide plate 210 above the light emitting device 200. However, for example, in the application to the backlight unit of a liquid crystal display device, a plurality of optical sheets, including the light diffusion sheet, are typically interposed between the light emitting devices 200 and the liquid crystal panel. Therefore, it can be said that there is only a small possibility that the boundary between light emitting devices 200 is observed as a dark line.

According to the present embodiment, the light emitting surface is a collection of the upper surfaces 210a of the lightguide plates 210, which are the upper surfaces of the light emitting devices 200. Therefore, the light emitting module 300 may be easily applied to a plurality of liquid crystal panels of different screen sizes by changing the arrangement of light emitting devices 200 or changing the number of light emitting devices 200 included in the light emitting module 300. That is, there is no need to re-do the optical calculations for the lightguide plate 210 of the light emitting device 200, etc., or to re-make a mold for forming the lightguide plate 210, and it is possible to flexibly accommodate changes in the screen size. Therefore, changing the screen size will not lead to an increase in the manufacturing cost and the lead time.

Figure 31:
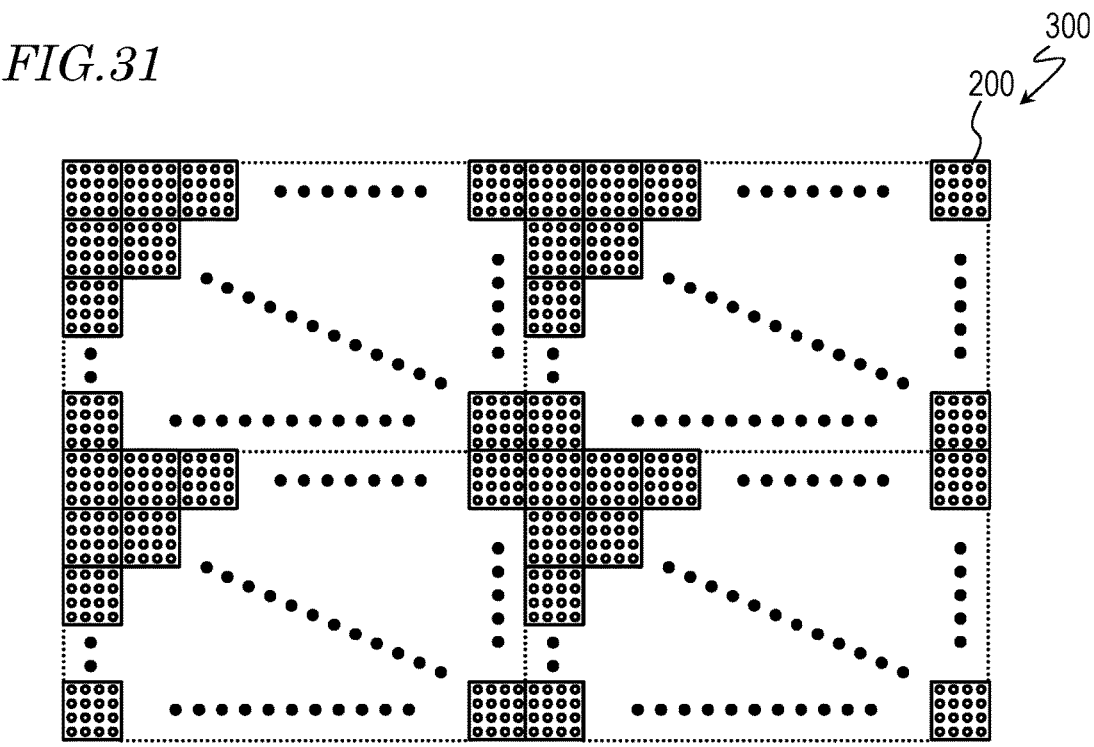
FIG. 31 is a plan view schematically showing a configuration obtained by arranging, in two rows by two columns, modules of FIG. 30 each including a plurality of light emitting devices 200.

FIG. 31 shows a configuration obtained by arranging, in two rows by two columns, modules of FIG. 30 each including a plurality of light emitting devices 200. In this case, a total of 512 light emitting devices 200 together form a surface light source that is compatible with a 31.2-inch screen size with an aspect ratio of 16:9. For example, the array of light emitting devices 200 shown in FIG. 31 may be used as the backlight unit of a liquid crystal television, etc. Thus, according to the present embodiment, it is relatively easy to obtain a large-area light emitting surface.

With a method of forming a light emitting surface of the light emitting module 300 by a combination of a plurality of light emitting devices 200, there is no need to re-design the optical system or to re-make a mold for forming the lightguide plate for a different screen size, and it is possible to flexibly accommodate liquid crystal panels of a variety of screen sizes. That is, it is possible to produce a backlight unit that is compatible with a certain screen size at a low cost and within a short period of time. Another advantage is that even if there is a light emitting element that cannot be lit due to a break in a wire, or the like, it is possible to simply replace a light emitting device that includes the inoperative light emitting element with another light emitting device.

(Electrical Connection Between Light Emitting Devices 200)

As described above with reference to FIG. 2, etc., the interconnect layer 160 may be provided on the lower surface 120b of the light-reflective member 120, wherein the interconnect layer 160 has electrical connections with light emitting elements in light emitting cells. With such a configuration, by connecting a power supply, or the like, to the interconnect layer 160, it is possible to easily make electrical connection between the light emitting elements in the light emitting devices 200 and the power supply, or the like. That is, it is possible to easily obtain a surface emission by connecting a power supply to the interconnect layer 160.

Figure 32:
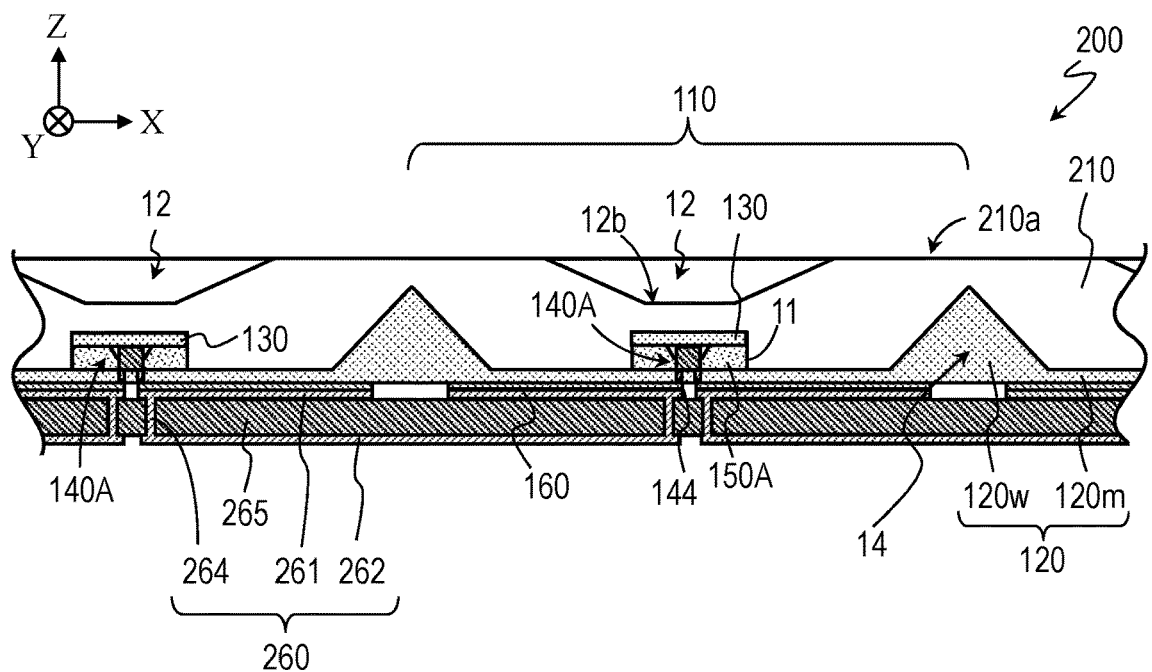
FIG. 32 is a schematic cross-sectional view showing the light emitting device 200 connected to an wiring board 260.

FIG. 32 shows a state where the light emitting device 200 is connected to the wiring board 260. In an embodiment, the light emitting device of the present disclosure may have the wiring board 260 as shown in FIG. 32. In the configuration illustrated in FIG. 32, the wiring board 260 includes an insulative base 265, a first interconnect layer 261 and a second interconnect layer 262 on the insulative base 265, and a plurality of vias 264. The first interconnect layer 261 is provided on one principal surface of the insulative base 265, and the second interconnect layer 262 is located on the other principal surface of the insulative base 265. The first interconnect layer 261 and the second interconnect layer 262 are electrically connected to each other through the vias 264 arranged in the insulative base 265.

The wiring board 260 is located on the lower surface side of the light emitting device 200, i.e., the opposite side from the upper surface 210a of the lightguide plate 210, and the first interconnect layer 261 faces the interconnect layer 160 of the light emitting device 200. The light emitting device 200 is mounted on the wiring board 260 by joining the interconnect layer 160 with the first interconnect layer 261 of the wiring board 260 by solder, or the like. According to the present embodiment, the interconnect layer 160 having connections with the light emitting elements may be provided on the light emitting device 200 side, and it is possible to easily form connections that are required for local dimming, etc., without having to form a complicated wiring pattern on the wiring board 260 side. Since the interconnect layer 160 has a larger area than the lower surface of the electrode 144 of each light emitting element, it is relatively easy to form an electrical connection with the first interconnect layer 261. Alternatively, when the light emitting device 200 does not include the interconnect layer 160, for example, the electrode of the light emitting element may be connected to the first interconnect layer 261 of the wiring board 260.

Figure 33:
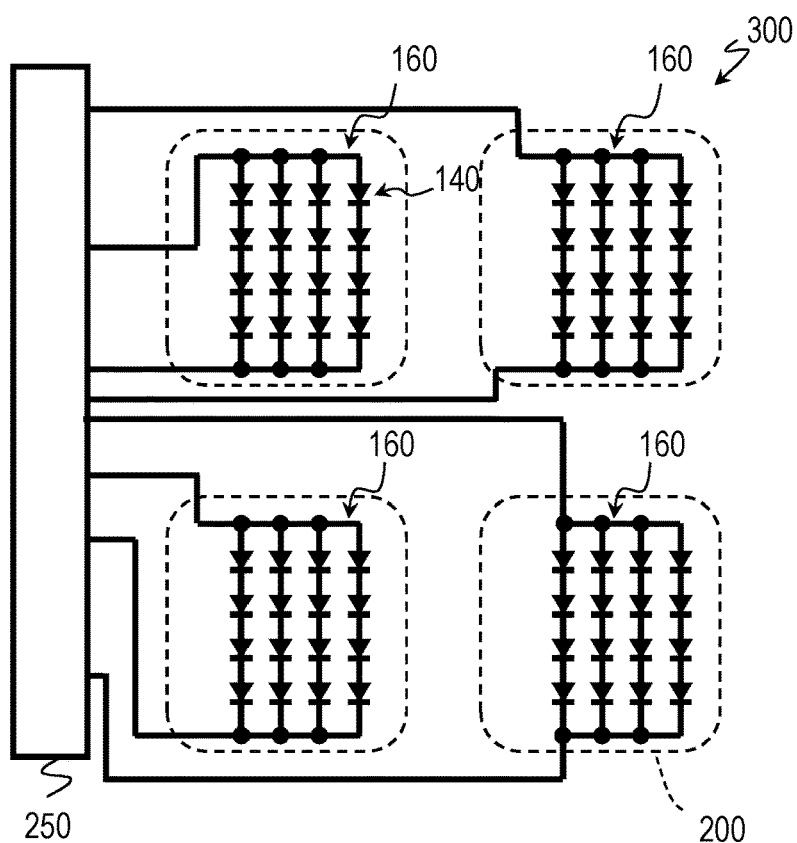
FIG. 33 is a schematic circuit diagram showing an example of a wiring pattern of an interconnect layer 160.

FIG. 33 shows an example of a wiring pattern of the interconnect layer 160. For the sake of simplicity, FIG. 33 schematically shows the electrical connection between only four of a plurality of light emitting devices 200 that may be included in the light emitting module 300.

The light emitting module 300 includes the interconnect layer 160 for each light emitting device 200, and the interconnect layer 160 of each light emitting device 200 electrically connects together a plurality of light emitting elements 140 included in the light emitting device 200. Herein, the light emitting element 140 shown in FIG. 33 is the light emitting element 140A or the light emitting element 140B described above. In the example shown in FIG. 33, the interconnect layer 160 of each light emitting device 200 includes four groups of light emitting elements 140 connected in parallel to each other, each group including four light emitting elements 140 connected in series with each other.

As shown in FIG. 33, the interconnect layers 160 may each be connected to a driver 250 for driving the light emitting elements 140. The driver 250 may be arranged on a substrate, or the like, that supports the light emitting module(s) (e.g., the wiring board 260) and electrically connected to the interconnect layers 160, or may be arranged on a substrate that is separate from the substrate that supports the light emitting module(s) and electrically connected to the interconnect layers 160. With such a circuit configuration, it is possible to actuate local dimming by the unit of the light emitting device 200, including 16 light emitting elements 140. Needless to say, the connection between light emitting elements 140 by the interconnect layer 160 is not limited to the example shown in FIG. 33, but the connection may be made so that the light emitting elements 140 in the light emitting device 200 may be driven independently of each other. Alternatively, the light emitting elements 140 included in the light emitting device 200 may be divided into a plurality of groups, and the light emitting elements 140 may be electrically connected together so that the light emitting elements 140 may be driven by the unit of a group that includes a plurality of light emitting elements 140.

As described above, according to the embodiments of the present disclosure, it is possible to provide light source devices capable of flexibly accommodating a variety of screen sizes while further reducing the thickness. Note that in the embodiments described above, the array of the light emitting elements 140A, 140B and the array the light emitting devices 200 are merely examples, and there is no limitation on the number and the arrangement of the light emitting devices 200 in the light emitting module, for example. The embodiments described above are merely examples, and various combinations are possible as long as they do not lead to technical contradictions.

The embodiments of the present disclosure are useful in various types of light sources for lighting, on-vehicle light sources, display light sources, etc.

Particularly, the embodiments of the present disclosure are advantageously applicable to backlight units for liquid crystal display devices. The light emitting device according to the embodiments of the present disclosure may suitably be used in backlights for display devices of mobile devices, for which there are strong demands for reducing the thickness, surface-emitting devices that are capable of local dimming, etc.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A light emitting device comprising:
a lightguide plate including a first surface on which a plurality of first recesses are provided, and a second surface located on an opposite side from the first surface;
a light-reflective resin layer that is located on a bottom portion of each first recess;
a plurality of light emitting elements each having an upper surface and a lateral surface, wherein each one of the plurality of light emitting elements is arranged in a corresponding one of the plurality of first recesses; and
a plurality of wavelength conversion members, wherein:
the upper surface of each light emitting element is attached to the light-reflective resin layer; and
each of the plurality of wavelength conversion members covers the lateral surface of the light emitting element in the first recess,
wherein:
each of the plurality of light emitting elements includes an electrode provided on an opposite side from the upper surface;
the light emitting device further includes a light-reflective member that is located on a side of the first surface of the lightguide plate and covers an area excluding the electrode;
the lightguide plate has a rectangular outer shape as seen in a plan view;
an outer shape of each first recess as seen in a plan view is a rectangular shape; and
each side of the rectangular outer shape of each first recess is generally parallel to a diagonal line of the rectangular outer shape of the lightguide plate.

2. The light emitting device according to claim 1, wherein:
each light emitting element includes a reflective film on a side of the upper surface; and
a portion of the light-reflective resin layer is located between the reflective film and the bottom portion of the first recess.

3. A light emitting device comprising:
a lightguide plate including a first surface on which a plurality of first recesses are provided, and a second surface located on an opposite side from the first surface;
a plurality of light emitting elements each having an upper surface and a lateral surface, wherein each one of the plurality of light emitting elements is arranged in a corresponding one of the plurality of first recesses; and
a plurality of wavelength conversion members, wherein:
each light emitting element includes a reflective film on a side of the upper surface;
the reflective film of each light emitting element is attached to a bottom portion of the first recess; and
each of the plurality of wavelength conversion members covers the lateral surface of the light emitting element in the first recess,
wherein:
each of the plurality of light emitting elements includes an electrode provided on an opposite side from the upper surface;
the light emitting device further includes a light-reflective member that is located on a side of the first surface of the lightguide plate and covers an area excluding the electrode;
the lightguide plate has a rectangular outer shape as seen in a plan view;
an outer shape of each first recess as seen in a plan view is a rectangular shape; and
each side of the rectangular outer shape of each first recess is generally parallel to a diagonal line of the rectangular outer shape of the lightguide plate.

4. The light emitting device according to claim 3, further comprising a light-reflective resin layer arranged on an area of the bottom portion of each first recess excluding an area thereof where the reflective film is attached.

5. The light emitting device according to claim 1, wherein:
the second surface of the lightguide plate includes a plurality of light diffusion structures; and
the plurality of light diffusion structures are located on an opposite side from the plurality of first recesses.

6. The light emitting device according to claim 3, wherein:
the second surface of the lightguide plate includes a plurality of light diffusion structures; and
the plurality of light diffusion structures are located on an opposite side from the plurality of first recesses.

7. The light emitting device according to claim 5, wherein each of the light diffusion structures is a second recess.

8. The light emitting device according to claim 6, wherein each of the light diffusion structures is a second recess.

9. The light emitting device according to claim 1, further comprising an interconnect layer that is located on the light-reflective member and electrically connected to the electrode.

10. The light emitting device according to claim 3, further comprising an interconnect layer that is located on the light-reflective member and electrically connected to the electrode.

11. The light emitting device according to claim 3, wherein the lightguide plate has a rectangular outer shape as seen in a plan view.

12. The light emitting device according to claim 11, wherein:
an outer shape of each first recess as seen in a plan view is a rectangular shape; and
each side of the rectangular outer shape of each first recess is generally parallel to a diagonal line of the rectangular outer shape of the lightguide plate.

13. The light emitting device according to claim 1, wherein the light-reflective member includes a wall portion that projects from a side of the first surface toward a side of the second surface and includes a slope surrounding the light emitting element.

14. The light emitting device according to claim 3, wherein the light-reflective member includes a wall portion that projects from a side of the first surface toward a side of the second surface and includes a slope surrounding the light emitting element.

15. A light emitting module comprising a plurality of the light emitting devices according to claim 1, wherein the light emitting module has a two-dimensional array of the light emitting devices.

16. A light emitting module comprising a plurality of the light emitting devices according to claim 3, wherein the light emitting module has a two-dimensional array of the light emitting devices.

17. The light emitting device according to claim 1, wherein the light-reflective resin layer has a reflectivity of 60% or more at an emission peak wavelength of the light emitting element.

18. The light emitting device according to claim 3, wherein the light-reflective resin layer has a reflectivity of 60% or more at an emission peak wavelength of the light emitting element.

* * * * *